(12) United States Patent
Hwang et al.

(10) Patent No.: US 10,420,035 B2
(45) Date of Patent: Sep. 17, 2019

(54) METHOD FOR EXECUTING POWER CONTROL AND USER EQUIPMENT

(71) Applicant: LG ELECTRONICS INC., Seoul (KR)

(72) Inventors: Daesung Hwang, Seoul (KR); Yunjung Yi, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/007,379

(22) Filed: Jun. 13, 2018

(65) Prior Publication Data

US 2018/0295586 A1   Oct. 11, 2018

Related U.S. Application Data

(63) Continuation of application No. 15/300,671, filed as application No. PCT/KR2015/001075 on Feb. 2, 2015, now Pat. No. 10,028,230.

(Continued)

(51) Int. Cl.
*H04W 52/14* (2009.01)
*H04L 1/18* (2006.01)
(Continued)

(52) U.S. Cl.
CPC ......... *H04W 52/146* (2013.01); *H04L 1/1893* (2013.01); *H04L 5/0048* (2013.01);
(Continued)

(58) Field of Classification Search
CPC ............. H04W 52/146; H04W 52/281; H04W 52/367; H04W 52/248; H04W 52/265;
(Continued)

(56) References Cited

U.S. PATENT DOCUMENTS

2010/0246463 A1   9/2010   Papasakellariou et al.
2013/0176953 A1*  7/2013   Stern-Berkowitz ........................
                                                    H04W 52/146
                                                    370/329
(Continued)

FOREIGN PATENT DOCUMENTS

CN           103119989           5/2013

OTHER PUBLICATIONS

Panasonic, "Uplink transmission power management and PHR reporting for dual connectivity", 3GPP TSG RAN WG2 Meeting #84, R2-133945, Nov. 1, 2013, 3 pages.

(Continued)

*Primary Examiner* — Shaima Q Aminzay
(74) *Attorney, Agent, or Firm* — Fish & Richardson P.C.

(57) ABSTRACT

A disclosure of the present specification provides a method for executing power control by a user equipment (UE). The method may include the steps of: determining a first amount of power for transmitting a first uplink control information (UCI) by a user equipment (UE) set to have a dual connectivity with a first cell group and a second cell group; and determining a second amount of power for transmitting a second UCI. Herein, when the first UCI includes HARQ-ACK but the second UCI does not include HARQ-ACK, the determination of the first amount of power may have a priority over the determination of the second amount of power.

16 Claims, 14 Drawing Sheets

Related U.S. Application Data

(60) Provisional application No. 61/977,109, filed on Apr. 9, 2014, provisional application No. 61/984,003, filed on Apr. 24, 2014, provisional application No. 62/004,222, filed on May 29, 2014, provisional application No. 62/055,633, filed on Sep. 25, 2014, provisional application No. 62/060,589, filed on Oct. 7, 2014.

(51) Int. Cl.
*H04L 5/00* (2006.01)
*H04W 72/04* (2009.01)
*H04W 52/28* (2009.01)
*H04W 52/34* (2009.01)

(52) U.S. Cl.
CPC ......... *H04L 5/0055* (2013.01); *H04W 52/281* (2013.01); *H04W 52/34* (2013.01); *H04W 72/0413* (2013.01)

(58) Field of Classification Search
CPC . H04W 52/325; H04W 52/346; H04W 52/40; H04W 72/044; H04W 72/1268; H04W 76/15; H04W 88/06
USPC ........................................... 455/522
See application file for complete search history.

(56) References Cited

U.S. PATENT DOCUMENTS

| | | | |
|---|---|---|---|
| 2013/0272230 A1* | 10/2013 | Dinan | H04W 52/18 370/329 |
| 2014/0056278 A1* | 2/2014 | Marinier | H04W 72/044 370/330 |
| 2014/0092785 A1 | 4/2014 | Song et al. | |
| 2014/0119304 A1 | 5/2014 | Li | |
| 2014/0192738 A1* | 7/2014 | Nam | H04L 5/001 370/329 |
| 2015/0271765 A1 | 9/2015 | Hakola et al. | |
| 2017/0188311 A1 | 6/2017 | Hwang et al. | |

OTHER PUBLICATIONS

Ericsson, "Considerations on power control for Dual Connectivity", 3GPP TSG RAN WG2 #84, Tdoc R2-134234, Nov. 2, 2013, 4 pages.
LG Electronics Inc., "Management of UE Transmit Power in Dual Connectivity", 3GPP TSG-RAN2 Meeting #83bis, R2-133538, Sep. 28, 2013, 2 pages.
European Patent Office Application Serial No. 15776874.8, Partial Search Report dated Oct. 5, 2017, 17 pages.
European Patent Office Application Serial No. 15776874.8, Search Report dated Jan. 23, 2018, 16 pages.
NTTCOCOMO, "Outcome of offline discussion on TPC aspects of dual connectivity", R1-141863, 3GPP TSG RAN WG1 Meeting #76bis, Apr. 2014, 17 pages.
Fujitsu, "Power allocation strategy for power limited UEs in dual-connectivity" R1-140193, 3GPP TSG RAN WG1 Meeting #76, Feb. 2014, 8 pages.
Fujitsu, "Power allocation strategy for power limited UEs in dual-connectivity", R1-141227, 3GPP TSG RAN WG1 Vleeting #76bis, Apr. 2014, 6 pages.
United States Patent and Trademark Office U.S. Appl. No. 15/300,671, Office Action dated Nov. 17, 2017, 19 pages.
State Intellectual Property Office of the People's Republic of China Application Serial No. 201580018826.3, Office Action dated Nov. 2, 2018, 8 pages.
Japan Patent Office Application No. 2016-559852, Office Action dated Dec. 14, 2018. 5 pages.
LG Electronics, "Physical layer impact of dual connectivity", R1-140321, 3GPP TSG RAN WG1 Meeting #76, Feb. 2014, 3 pages.

\* cited by examiner

METHOD FOR EXECUTING POWER CONTROL AND USER EQUIPMENT

CROSS-REFERENCE TO RELATED APPLICATIONS

This application is a continuation of U.S. patent application Ser. No. 15/300,671, filed on Sep. 29, 2016, now U.S. Pat. No. 10,028,230, which is the National Stage filing under 35 U.S.C. 371 of International Application No. PCT/KR2015/001075, filed on Feb. 2, 2015, which claims the benefit of U.S. Provisional Application Nos. 61/977,109, filed on Apr. 9, 2014, 61/984,003, filed on Apr. 24, 2014, 62/004,222, filed on May 29, 2014, 62/055,633, filed on Sep. 25, 2014 and 62/060,589, filed on Oct. 7, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in order to process a growing number of data, in a next-generation mobile communication system, a small cell having a small cell coverage radius is anticipated to be added to coverage of an existing cell and process more traffic.

On the other hand, the UE may be dually connected to the macro cell and the small cell.

However, the power control method of the terminal considering the dual connection situation has not yet been researched.

SUMMARY OF THE INVENTION

Accordingly, a disclosure of the present specification has been made in an effort to solve the aforementioned problem.

To achieve the aforementioned purposes of the present invention, one disclosure of the present specification provides a method for performing a power control. The method may performed by a user equipment (UE) and comprise: determining, by the UE configured with dual connectivity to a first cell group and a second cell group, first amount of power for a transmission of a first UCI; and determining second amount of power for a transmission of a second UCI. If the first UCI includes HARQ-ACK and if the second UCI does not include HARQ-ACK, the determination of the first amount of the power is prioritized over the determination of the second amount of the power.

If the first UCI includes HARQ-ACK to the first cell group and if the second UCI include HARQ-ACK to the second cell group, the determination of the first amount of the power may be prioritized over the determination of the second amount of the power.

The method may further comprise: scaling down the first amount of the power if the first amount of the power exceeds a specific value.

In the determinations, a first guaranteed power for a first eNodeB and a second guaranteed power for a second eNodeB may be considered.

The method may further comprise: receiving information on the first guaranteed power and the second guaranteed power The first guaranteed power may be expressed as P_MeNB and the second guaranteed power may be expressed as P-SeNB The determinations may be performed if a first subframe on which the first UCI is transmitted to a first cell group is overlapped with a second subframe on which the second UCI is transmitted to a second cell group.

To achieve the aforementioned purposes of the present invention, one disclosure of the present specification provides a user equipment (UE) for performing a power control. The UE may comprise: a radio frequency (RF) unit; and a processor configured to determine first amount of power for a transmission of a first UCI and second amount of power for a transmission of a second UCI if a dual connectivity to a first cell group and a second cell group is configured through the RF unit. Here, if the first UCI includes HARQ-ACK and if the second UCI does not include HARQ-ACK, the determination of the first amount of the power is prioritized over the determination of the second amount of the power.

To achieve the aforementioned purposes of the present invention, one disclosure of the present specification also provides a method for performing a power control. The method may be performed by a user equipment (UE) and comprise: determining, by the UE configured with dual connectivity to a first cell group and a second cell group, first amount of transmission power toward the first cell group. Here, if a first subframe for a transmission to the first cell group is overlapped with a second subframe for a transmission to the second cell group, and if the first frame is used to transmit a sounding reference signal (SRS), a power for transmitting the SRS is prioritized in the determination.

According to a disclosure of the present invention, the above problme of the related art is solved.

DESCRIPTION OF EXEMPLARY EMBODIMENTS

Figure 1:
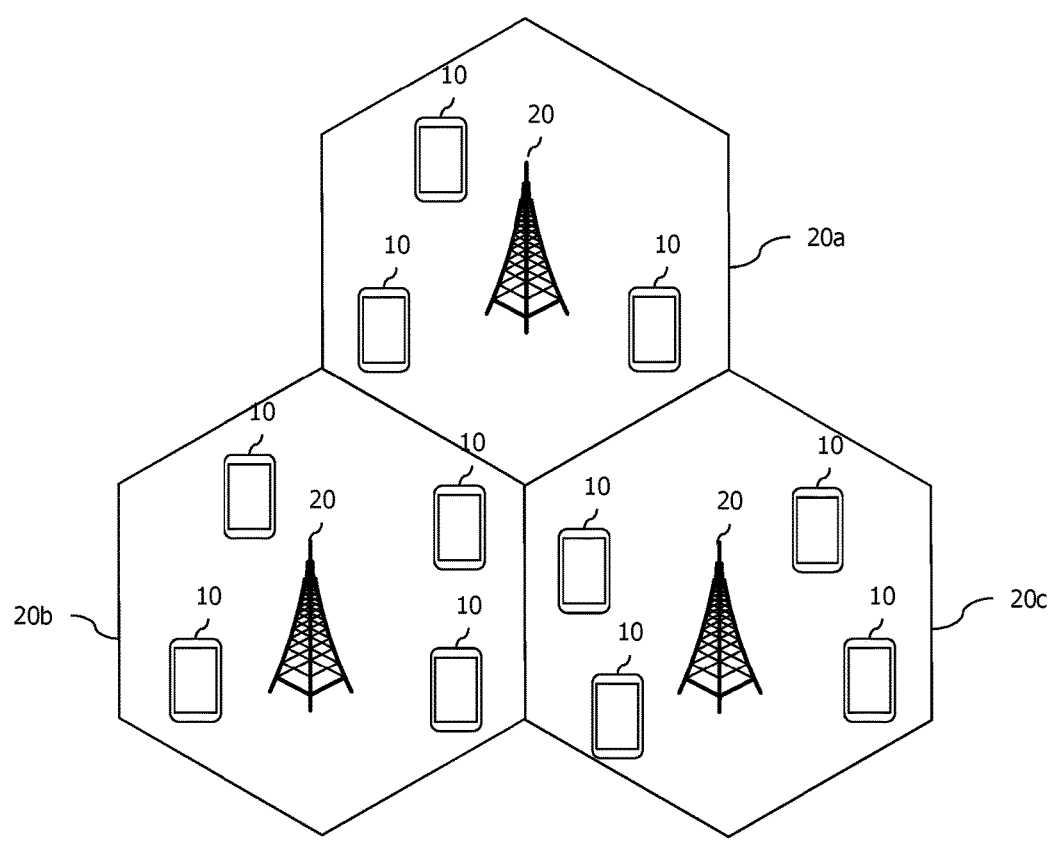
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS(mobile station), UT(user terminal), SS(subscriber station), MT(mobile terminal) and etc.

Referring to FIG. 1, the wireless communication system includes at least one base station (BS) 20. Respective BSs 20 provide a communication service to particular geographical areas 20*a*, 20*b*, and 20*c* (which are generally called cells). The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
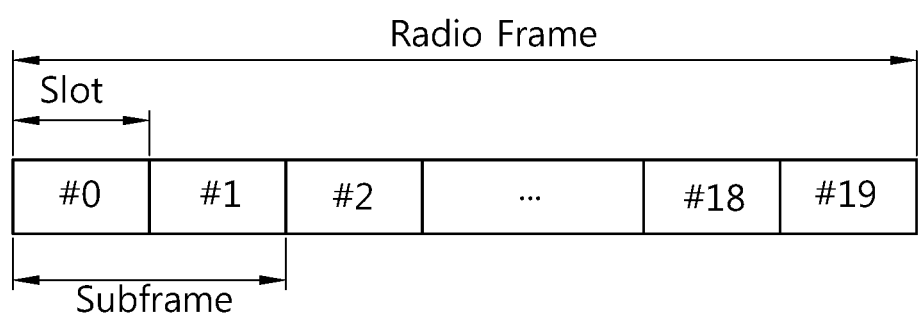
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
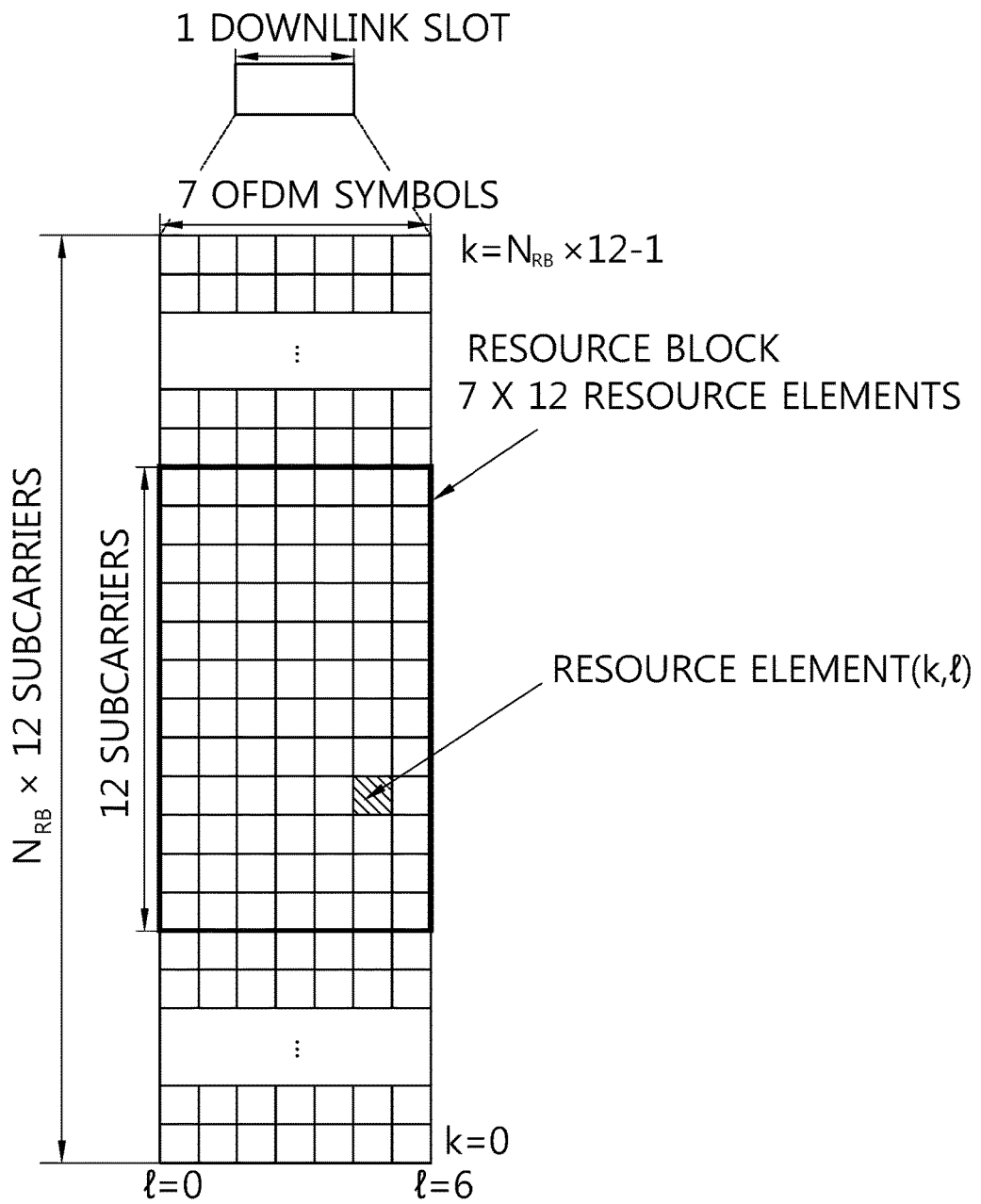
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
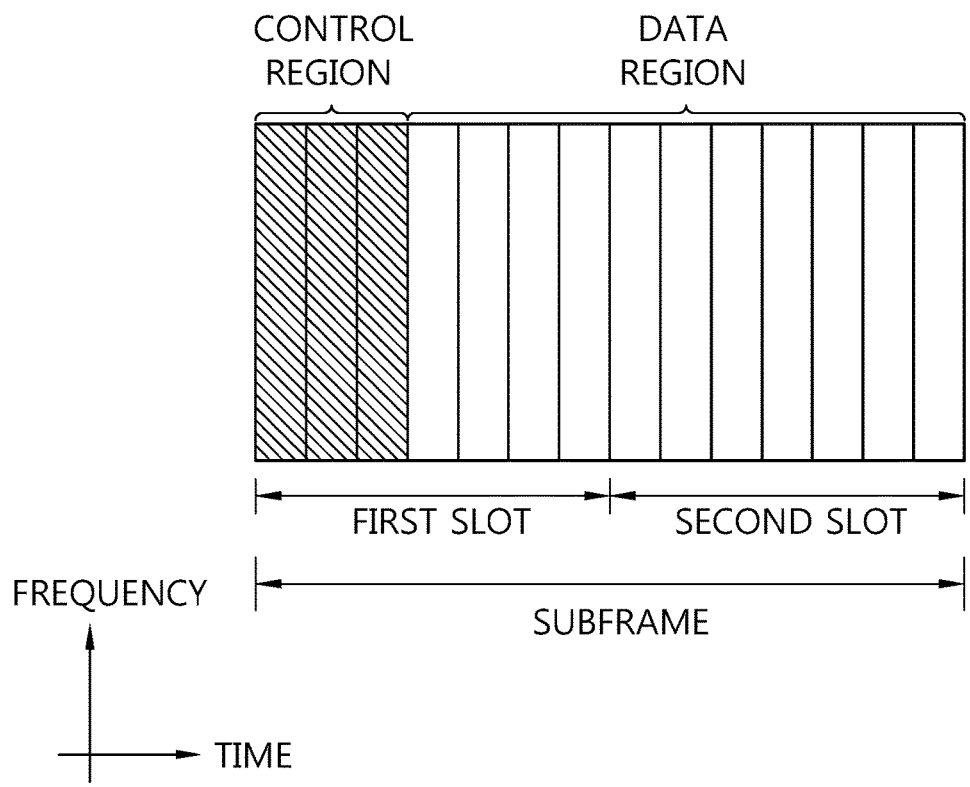
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over interne protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
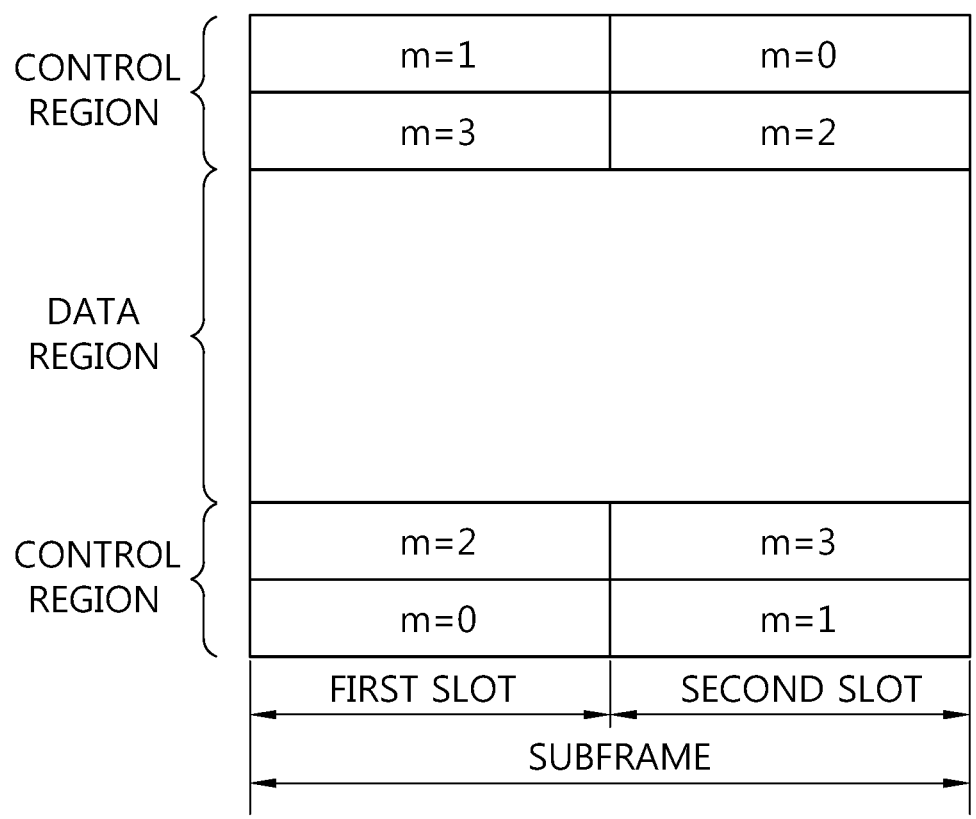
FIG. 5 illustrates the architecture of an uplink subframe in 3GPP LTE.
Figure 5:
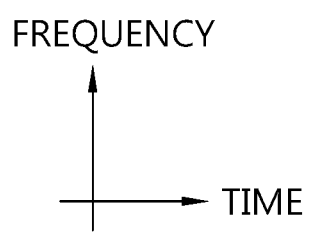

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only the bandwidths of the 3GPP LTE system. Alternatively, the wideband may be configured by not using the bandwidth of the existing system but defining a new bandwidth.

Meanwhile, in order to transmit/receive packet data through a specific secondary cell in the carrier aggregation, the UE first needs to complete configuration for the specific secondary cell. Herein, the configuration means a state in which receiving system information required for data transmission/reception for the corresponding cell is completed. For example, the configuration may include all processes that receive common physical layer parameters required for the data transmission/reception, media access control (MAC) layer parameters, or parameters required for a specific operation in an RRC layer. When the configuration-completed cell receives only information indicating that the packet data may be transmitted, the configuration-completed cell may immediately transmit/receive the packet.

The configuration-completed cell may be present in an activation or deactivation state. Herein, the activation transmitting or receiving the data or a ready state for transmitting or receiving the data. The UE may monitor or receive the control channel (PDCCH) and the data channel (PDSCH) of the activated cell in order to verify resources (a frequency, a time, and the like) assigned thereto.

The deactivation represents that transmitting or receiving traffic data is impossible or measurement or transmitting/receiving minimum information is possible. The UE may receive system information SI required for receiving the packet from the deactivated cell. On the contrary, the UE does not monitor or receive the control channel (PDCCH) and the data channel (PDSCH) of the deactivated cell in order to verify the resources (the frequency, the time, and the like) assigned thereto.

<Transmission of Uplink Control Information (UCI)>

Uplink control information (UCI) may be transmitted on the PUCCH. In this case, the PUCCH carries various types of control information according to a format. The UCI includes HARQ ACK/NACK, searching request (SR), and channel state information (CSI) indicating a downlink channel state.

Hereinafter, periodic transmission and aperiodic transmission of the CSI will be described.

The CSI as an index indicating a state of a DL channel may include at least any one of a channel quality indicator (CQI) and a precoding matrix indicator (PMI). Further, the CSI may include a precoding type indicator (PTI), a rank indication (RI), and the like.

The CQI provides information on a link adaptive parameter which the UE may support with respective to a given time. The CQI may be generated by various methods. For example, the various methods includes a method that just quantizes and feeds back the channel state, a method that calculates and feeds back a signal to interference plus noise ratio (SINR), a method that announces a state actually applied to the channel, such as a modulation coding scheme (MCS), and the like. When the CQI is generated based on the MCS, the MCS includes a modulation scheme, a coding scheme and the resulting coding rate. In this case, the base station may determine m-phase shift keying (m-PSK) or m-quadrature amplitude modulation (m-QAM) and coding rate by using the CQI. A table given below shows a modulation scheme, code rate, and efficiency depending on a CQI index. The CQI index shown in the table given below may be expressed as 4 bits.

TABLE 1

| CQI index | Modulation | Code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The PMI provides information on a precoding matrix in precoding a codebook base. The PMI is associated with multiple input multiple output (MIMO). In the MIMO, feed-back of the PMI is called closed loop MIMO.

The RI represents information on the number layers recommended by the UE. That is, the RI represents the number of independent streams used in spatial multiplexing. The RI is fed back only when the UE operates in an MIMO mode using the spatial multiplexing. The RI is continuously associated with one or more CQI feed-backs. That is, the CQI which is fed back is calculated assuming a specific RI value. Since a rank of the channel is generally changed more slowly than the CQI, the RI is fed back at the smaller number of times than the CQI. A transmission period of the RI may be multiple of a transmission period of the CQI/PMI. The RI is given with respect all system bands and frequency selective RI feed-back is not supported.

Figure 6A:
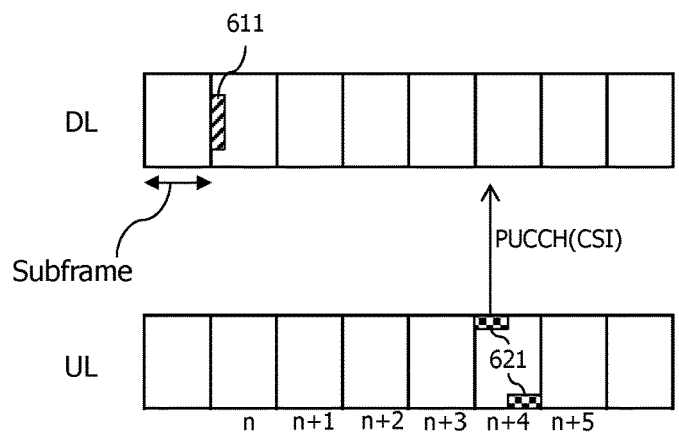
FIG. 6a illustrates one example of periodic CSI reporting in 3GPP LTE.

FIG. 6a illustrates one example of periodic CSI reporting in 3GPP LTE.

As seen with reference to FIG. 6a, the CSI may be periodically transmitted through a PUCCH 621 according to a period determined on a higher layer. That is, the periodic channel state information (CSI) may be transmitted through the PUCCH.

The UE may be semistatically configured by a higher layer signal so as to periodically feed back differential CSIs (CQI, PMI, and RI) through the PUCCH. In this case, the UE transmits the corresponding CSI according to modes defined as shown in a table given below.

TABLE 2

| | | PMI feed-back time | |
|---|---|---|---|
| | | No PMI | Single PMI |
| PUCCH CQI feed-back type | Wideband CQI | Mode 1-0 | Mode 2-0 |
| | Selective subband CQI | Mode 2-0 | Mode 2-1 |

A periodic CSI reporting mode in the PUCCH described below is supported for each transmission mode.

TABLE 3

| Transmission mode | PUCCH CSI reporting modes |
|---|---|
| Transmission mode 1 | Modes 1-0, 2-0 |
| Transmission mode 2 | Modes 1-0, 2-0 |

TABLE 3-continued

| Transmission mode | PUCCH CSI reporting modes |
|---|---|
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | Modes 1-1, 2-1 when PMI/RI reporting is configured for the UE; modes 1-0, 2-0 when the PMI/RI reporting is not configured for the UE |
| Transmission mode 9 | Modes 1-1, 2-1 when the PMI/RI reporting is configured for the UE and the number of CSI-RS ports is larger than 1. modes 1-0, 2-0 when the PMI/RI reporting is not configured for the UE or when the number of CSI-RS ports is 1 |

Meanwhile, a collision of the CSI reports represents a case in which a subframe configured to transmit a first CSI and a subframe configured to transmit a second CSI are the same as each other. When the collision of the CSI reports occurs, the first CSI and the second CSI may be simultaneously transmitted or transmission of a CSI having a lower priority may be dropped (alternatively, abandoned) a CSI having a higher priority may be transmitted according to priorities of the first CSI and the second CSI.

In the case of the CSI report through the PUCCH, various report types may be present as follows according to a transmission combination of the CQI/PMI/RI and period and offset values which are distinguished according to each report type (hereinafter, abbreviated as a type) are supported.

Type 1: Supports the CQI feed-back for a subband selected by the UE.

Type 1a: Supports a subband CQI and a second PMI feed-ack.

Types 2, 2b, 2c: Supports wideband CQI and PMI feed-backs.

Type 2a: Supports the wideband PMI feed-back.

Type 3: Supports an RI feed-back.

Type 4: Transmits a wideband CQI.

Type 5: Supports the RI and wideband PMI feed-back.

Type 6: Supports RI and PTI feed-backs.

Hereinafter, the aperiodic transmission of the CSI will be described.

Figure 6B:
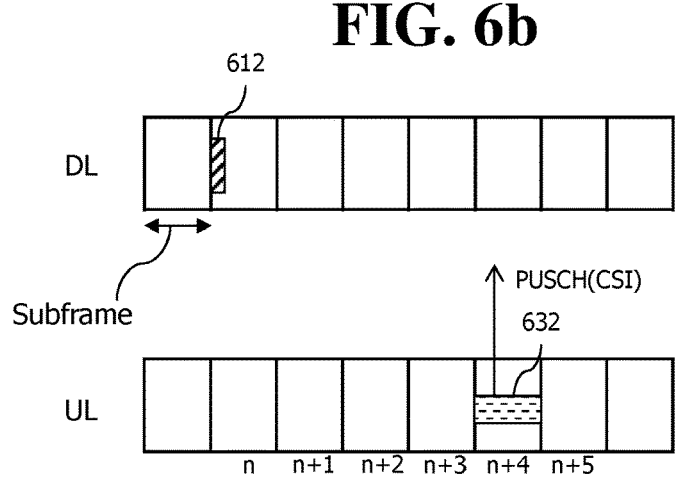
FIG. 6b illustrates one example of aperiodic CSI reporting in the 3GPP LTE.

FIG. 6b illustrates one example of aperiodic CSI reporting in the 3GPP LTE.

A control signal to request the CSI to be transmitted, that is, an aperiodic CSI request signal may be included in a scheduling control signal for the PUSCH transmitted to a PDCCH 612, that is, a UL grant. In this case, the UE aperiodically reports the CSI through a PUSCH 532. As described above, the CSI transmission on the PUSCH is referred to as the aperiodic CSI reporting in that the CSI transmission on the PUSCH is triggered by a request by the base station. The CSI reporting may be triggered by the UL grant or a random access response grant.

In more detail, the wireless device receives the UL grant including scheduling information for the PUSCH 632 to the PDCCH 612 in subframe n. The UL grant may be included in a CQI request field. A table given below shows one example of the CQI request field of 2 bits. A value or a bit count of the CQI request field is just an example.

TABLE 4

| Value of CQI request field | Contents |
|---|---|
| 00 | CSI reporting is not triggered |
| 01 | CSI reporting for a serving cell is triggered |
| 10 | CSI reporting for a first set of the serving cell is triggered |
| 11 | CSI reporting for a second set of the serving cell is triggered |

The base station may announce to the wireless device information on the first and second sets for which the CSI reporting is triggered in advance.

When the CSI reporting is triggered, the wireless device transmits the CSI on a PUSCH 620 in subframe n+k. Herein, k=4 or this is just an example.

The base station may designate a reporting mode (reporting mode) of the CSI for the wireless device.

A table given below illustrates one example of the CSI reporting mode in the 3GPP LTE.

TABLE 5

| | PMI feed-back type | | |
|---|---|---|---|
| | No PMI | Single PMI | Multiple PMI |
| Wideband CQI | | | Mode 1-2 |
| Selective subband CQI | Mode 2-0 | | Mode 2-2 |
| Set subband CQI | Mode 3-0 | Mode 3-1 | |

(1) Mode 1-2

The precoding matrix is selected on the assumption that DL data is transmitted through only the corresponding subband with respect to each subband. The wireless device assumes the precoding matrix selected with respect to a system band or a band (referred to as a band set S) designated by the higher layer signal and generates the CAI (referred to as the wideband CQI).

The wireless device transmits the CSI including the wideband CQI and the PMI of each subband. In this case, the size of each subband may vary depending on the size of the system band.

(2) Mode 2-0

The wireless device selects M subbands preferred with respect to the system band or the band (the band set S) designated by the higher layer signal. The wireless device generates the subband CQI on the assumption that data is transmitted in selected M subbands. The wireless device additionally generates one wideband CQI with respect to the system band or the band set S.

The wireless device transmits information on the selected M subbands, the subband CQI, and the wideband CQI.

(3) Mode 2-2

The wireless device selects M preferred subbands and a single precoding matrix for M preferred subbands on the assumption of transmitting the DL data through M preferred subbands.

The subband CQIs for M preferred subbands are defined for each codeword. The wireless device generates the wideband CQI with respect to the system band or the band set S.

The wireless device transmits the CSI including M preferred subbands, one subband CQI, PMIs for M preferred subbands, the wideband PMI, and the wideband CQI.

(4) Mode 3-0

The wireless device transmits the CSI including the wideband CQI and the subband CQI for the configured subband.

(5) Mode 3-1

The wireless device generates the single precoding matrix with respect to the system band or the band set S. The wireless device assumes the generated single precoding matrix and generates the subband CQI for each codeword. The wireless device may assume the single precoding matrix and generate the wideband CQI.

Hereinafter, simultaneous transmission of the PUCCH and the PUSCH will be described.

In a 3GPP release 8 or release 9 system, when the UE uses an SC-FDMA scheme in uplink transmission, the UE may not be allowed to simultaneously transmit the PUCCH and the PUSCH on one carrier in order to maintain a single carrier characteristic.

However, in a 3GPP release 10 system, whether to simultaneously transmit the PUCCH and the PUSCH may be indicated on a higher layer. That is, according to the indication of the higher layer, the UE may simultaneously transmit the PUCCH and the PUSCH or transmit only any one of the PUCCH and the PUSCH.

Figure 6C:
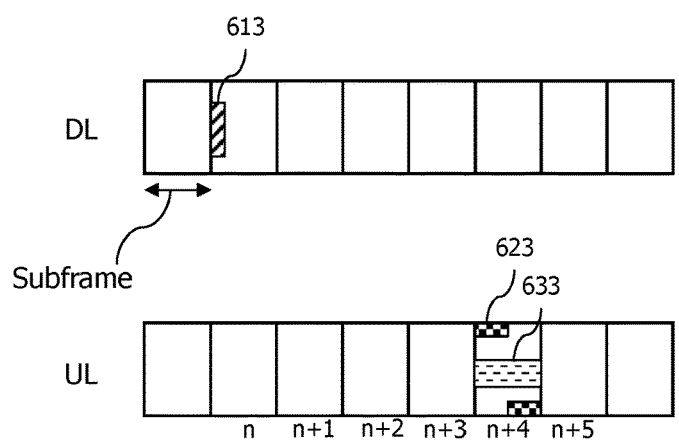
FIG. 6c illustrates one example of simultaneous transmission of PUCCH and PUSCH.

FIG. 6c illustrates one example of simultaneous transmission of PUCCH and PUSCH.

As seen with reference to FIG. 6c, the UE receives PDCCH 613 in the subframe n.

In addition, the UE may simultaneously transmit PUCCH 623 and PUSCH 633 in for example, a subframe n+4.

The simultaneous transmission of the PUCCH and the PUSCH is defined as follows in the 3GPP release 10 system.

It is assumed that the UE is configured for a single serving cell and the PUSCH and the PUCCH are configured not to be simultaneously transmitted. In this case, when the UE does not transmit the PUSCH, the UCI may be transmitted through PUCCH format 1/1a/1b/3. The UE transmits the PUSCH and when the PUSCH does not correspond to a random access response grant, the UCI may be transmitted through the PUSCH.

Unlike this, it is assumed that the UE is configured for the single serving cell and the PUSCH and the PUCCH are configured to be simultaneously transmitted. In this case, when the UCI is constituted only by HARQ-ACK and SR, the UCI may be transmitted through the PUCCH format 1/1a/1b/3. However, when the UCI is constituted only by the periodic CSI, the UCI may be transmitted on the PUCCH through PUCCH format 2. Alternatively, when the UCI is constituted by the periodic CSI and the HARQ-ACK and the UE does not transmit the PUSCH, the UCI may be transmitted on the PUCCH through PUCCH format 2/2a/2b. Alternatively, when the UCI is constituted only by HARQ-ACK/NACK, the UCI is constituted by the HARQ-ACK/NACK and the SR, the UCI is constituted by positive SR and the periodic/aperiodic CSI, or when the UCI is constituted only by the aperiodic CSI, the HARQ-ACK/NACK, the SR, and the positive SR may be transmitted to the PUCCH and the periodic/aperiodic CSI may be transmitted through the PUSCH.

Further, unlike this, it is assumed that the UE is configured for one or more serving cells and the PUSCH and the PUCCH are configured not to be simultaneously transmitted. In this case, when the UE does not transmit the PUSCH, the UCI may be transmitted onto the PUCCH according to the PUCCH format 1/1a/1b/3. However, when the UCI is constituted by the aperiodic CSI or when the UCI is constituted by the aperiodic CSI and the HARQ-ACK, the UCI may be transmitted through the PUSCH of the serving cell. Alternatively, when the UCI is constituted by the periodic CSI and the HARQ-ACK/NACK and the UE does not transmit the PUSCH in the subframe n of a primary cell, the UCI may be transmitted on the PUSCH.

Further, unlike this, it is assumed that the UE is configured for one or more serving cells and the PUSCH and the PUCCH are configured to be simultaneously transmitted. In this case, when the UCI is constituted by at least one of the HARQ-ACK and the SR, the UCI may be transmitted on the PUCCH through the PUCCH format 1/1a/1b/3. However, when the UCI is constituted only by the periodic CSI, the UCI may be transmitted onto the PUCCH by using the PUCCH format 2. Alternatively, when the UCI is constituted by the periodic CSI and the HARQ-ACK/NACK and the UE does not transmit the PUSCH, the CSI may not be transmitted but dropped (alternatively, abandoned). Alternatively, when the UCI is transmitted to the HARQ-ACK/NACK and the periodic CSI and the UE transmits the PUSCH on the subframe of the primary cell, the HARQ-ACK/NACK may be transmitted on the PUCCH by using the PUCCH format 1a/1b/3 and the periodic CSI may be transmitted on the PUSCH.

Figure 7:
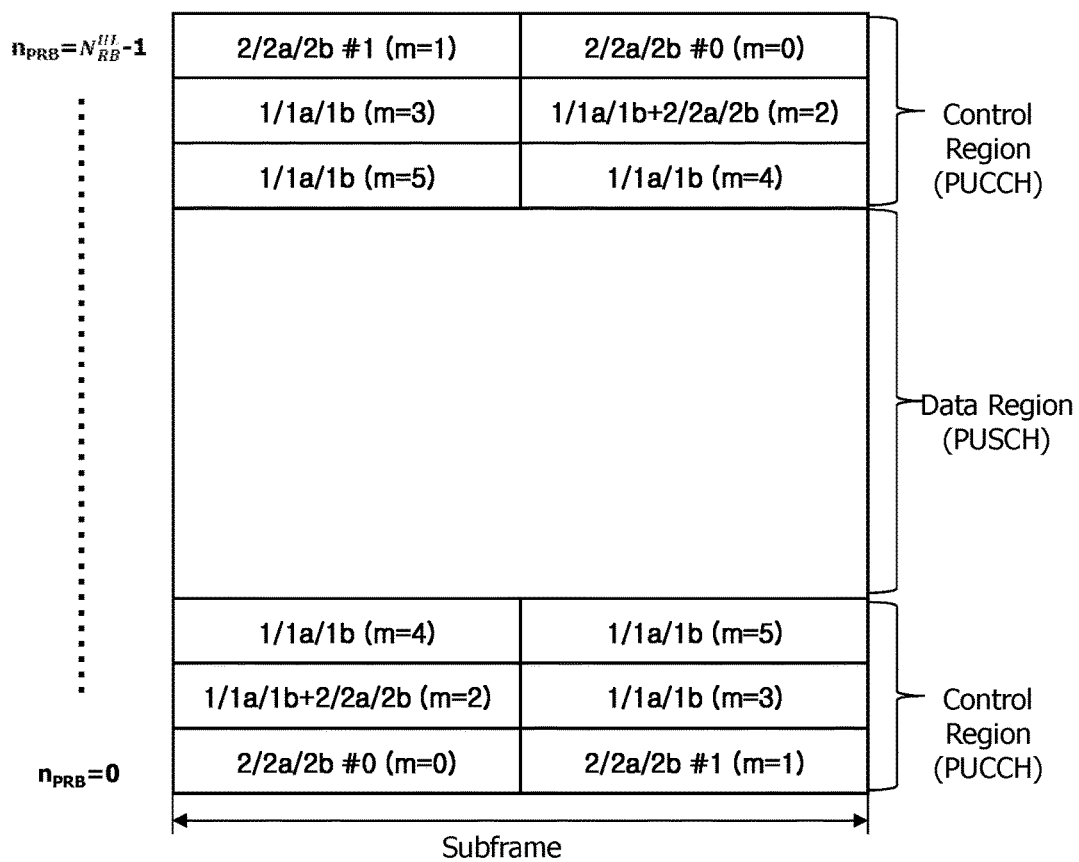
FIG. 7 illustrates the PUCCH and the PUSCH on an uplink subframe.

FIG. 7 illustrates the PUCCH and the PUSCH on an uplink subframe.

PUCCH formats will be described with reference to FIG. 7.

The PUCCH format 1 carries the scheduling request (SR). In this case, an on-off keying (OOK) mode may be applied. The PUCCH format 1a carries acknowledgement/non-acknowledgement (ACK/NACK) modulated in a binary phase shift keying (BPSK) mode with respect to one codeword. The PUCCH format 1b carries ACK/NACK modulated in a quadrature phase shift keying (QPSK) mode with respect to two codewords. The PUCCH format 2 carries a channel quality indicator (CQI) modulated in the QPSK mode. The PUCCH formats 2a and 2b carry the CQI and the ACK/NACK.

A table given below carries the PUCCH formats.

PUCCH format 2/2a/2b in which the CQI is transmitted may be indicated to the UE through a broadcasted signal.

Meanwhile, the PUSCH is mapped to an uplink shared channel (UL-SCH) which is a transport channel. Uplink data transmitted onto the PUSCH may be a transport block which is a data block for the UL-SCH during a TTI. The transport block may include user data. Alternatively, the uplink data may be multiplexed data. The multiplexed data may be obtained by multiplexing the transport block and the channel state information for the uplink shared channel (UL-SCH). For example, the channel state information (CSI) multiplexed to data may include the CQI, the PMI, the RI, and the like. Alternatively, the uplink data may be constituted only by the channel state information. The periodic or aperiodic channel state information may be transmitted through the PUSCH.

The PUSCH is assigned by the UL grant on the PDCCH. Although not illustrated in FIG. 7, a fourth OFDM symbol of each slot of a normal CP is used in transmission of a demodulation reference signal (DM RS) for the PUSCH.

<Introduction of Small Cell>

Meanwhile, in a next-generation mobile communication system, it is anticipated that a small cell having a small cell coverage radius will be added into coverage of the existing cell and it is anticipated that the small cell will process more traffic. Since the existing cell has larger than the small cell, the existing call may be called a macro cell. Hereinafter, the macro cell will be described with reference to FIG. 10.

Figure 8:
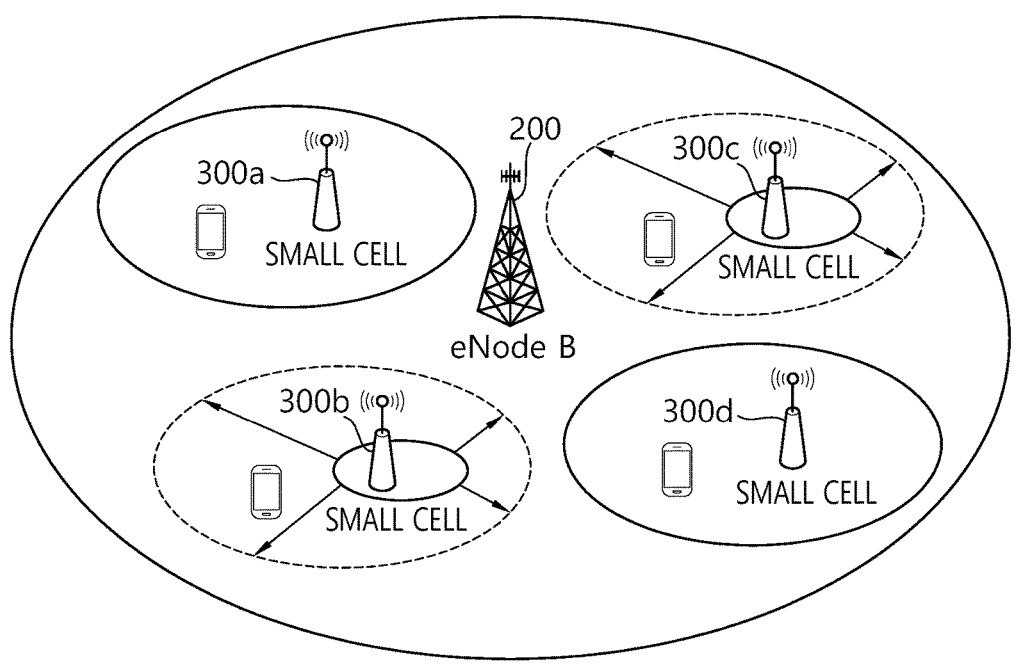
FIG. 8 is a diagram illustrating an environment of heterogeneous networks of a macro cell and a small cell which may become a next-generation wireless communication system.

FIG. 8 is a diagram illustrating an environment of heterogeneous networks of a macro cell and a small cell which may become a next-generation wireless communication system.

Referring to FIG. 8, a heterogeneous-network environment is shown, in which a macro cell by the existing base station 200 overlaps with a small cell by one or more small base stations 300*a*, 300*b*, 300*c*, and 300*d*. Since the existing

TABLE 6

| Format | Modulation mode | Total bit count per subframe | Description |
|---|---|---|---|
| Format 1 | Undecided | Undecided | Scheduling request (SR) |
| Format 1a | BPSK | 1 | ACK/NACK of 1-bit HARQ, scheduling request (SR) may be present or not present |
| Format 1b | QPSK | 2 | ACK/NACK of 2-bit HARQ, scheduling request (SR) may be present or not present |
| Format 2 | QPSK | 20 | In case of extended CP, CSI and 1-bit or 2-bit HARQ ACK/NACK |
| Format 2a | QPSK + BPSK | 21 | CSI and 1-bit HARQ ACK/NACK |
| Format 2b | QPSK + BPSK | 22 | CSI and 2-bit HARQ ACK/NACK |
| Format 3 | QPSK | 48 | Multiple ACKs/NACKs, CSI, and scheduling request (SR) may be present or not present |

Each PUCCH format is transmitted while being mapped to a PUCCH region. For example, the PUCCH format 2/2a/2b is transmitted while being mapped to resource blocks (m=0 and 1) of band edges assigned to the UE. A mixed PUCCH RB may be transmitted while being mapped to a resource block (e.g., m=2) adjacent to the resource block to which the PUCCH format 2/2a/2b is assigned in a central direction of the band. The PUCCH format 1/1a/1b in which the SR and the ACK/NACK are transmitted may be disposed in a resource block in which m=4 or m=5. The number $(N^{(2)}_{RB})$ of resource blocks which may be used in the base station provides the larger coverage than the small base station, the existing base station may be called the macro base station (macro eNodeB, MeNB). In the present specification, terms such as the macro cell and the macro base station will be mixed and used. The UE that accesses the macro cell 200 may be called macro UE. The macro UE receives a downlink signal from the macro base station and transmits an uplink signal to the macro base station.

In the heterogeneous networks, the macro cell is configured as a primary cell (Pcell) and the small cell is configured as a secondary cell (Scell) to fill a coverage gap of the macro cell. Further, the small cell is configured as the primary cell (Pcell) and the macro cell is configured as the secondary cell (Scell) to boost overall performance.

Meanwhile, the small cell may use a frequency band assigned to current LTE/LTE-A or use a higher frequency band (e.g., a band of 3.5 GHz or higher).

On the other hand, in a next LTE-A system, it is considered that the small cell may not be independently used and the small cell may be used only as a macro-assisted small cell which may be used under assistance of the macro cell.

The small cells 300a, 300b, 300c, and 300d may have similar channel environments to each other and since the small cells 300a, 300b, 300c, and 300d are positioned at distances which are proximate to each other, interference among the small cells may be large.

In order to reduce an interference influence, the small cells 300b and 300c may extend or reduce coverage thereof. The extension and reduction of the coverage is referred to as cell breathing. For example, as illustrated in FIG. 8, the small cells 300b and 300c may be turned on or off according to a situation.

On the other hand, the small cell may use the frequency band assigned to the current LTE/LTE-A or use the higher frequency band (e.g., a band of 3.5 GHz or higher).

Meanwhile, the UE may be dually connected to the macro cell and the small cell. Scenarios in which the dual connectivity is possible are illustrated in FIGS. 9a and 9b.

Figure 9A:
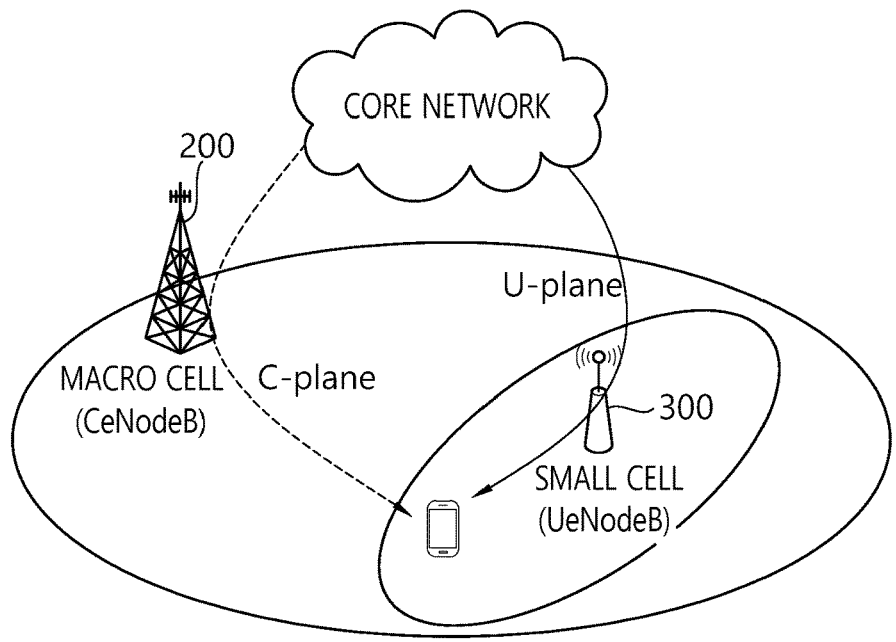
FIGS. 9*a* and 9*b* illustrate scenarios of dual connectivity possible with respect to the macro cell and the small cell.
Figure 9B:
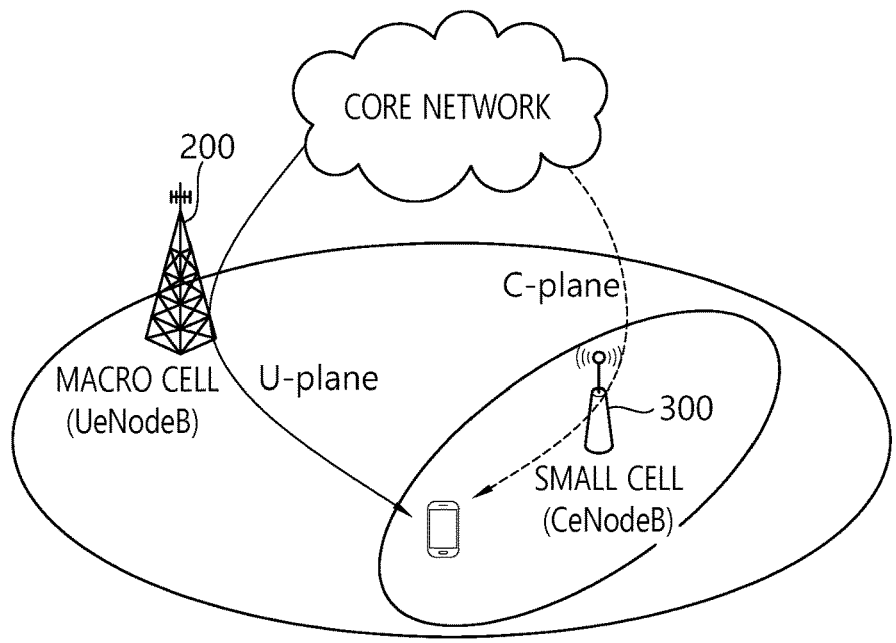

FIGS. 9a and 9b illustrate scenarios of dual connectivity possible with respect to the macro cell and the small cell.

As illustrated in FIG. 9a, the UE may configure the macro cell as a control-plane (hereinafter, referred to as 'C-plane') and configured the small cell as a user-plane (hereinafter, referred to as 'U-plane').

Alternatively, as illustrated in FIG. 9b, the UE may configure the small cell as the C-plane and configure the macro cell as the U-plane. In the present specification, for easy description, a cell of the C-plane will be called 'C-cell' and a cell of the U-plane will be called 'U-cell'.

Herein, the mentioned C-plane means supporting a procedure required for RRC connection configuration and reconfiguration, an RRC idle mode, mobility including handover, cell selection and reselection, an HARQ process, configuration and reconfiguration of carrier aggregation (CA), and RRC configuration, a random access procedure, and the like. In addition, the mentioned U-plane means supporting data processing of an application, CSI reporting, an HARQ process for application data, a multicasting/broadcasting, and the like.

From the viewpoint of the UE, the C-plane and the U-plane are configured as follows. The C-cell may be configured as the primary cell and the U-cell may be configured as the secondary cell. Alternatively, contrary to this, the U-cell may be configured as the primary cell and the C-cell may be configured as the secondary cell. Alternatively, the C-cell may be separately particularly processed and the U-cell may be configured as the primary cell. Alternatively, both the C-plane and the U-plane may be configured as the primary cell. However, in the present specification, for easy description, the configuration of the cell will be described on the assumption that the C-cell is configured as the primary cell and the U-cell is configured as the secondary cell.

Meanwhile, since the handover may excessively frequently occur under a situation in which the UE 100 frequently moves within a short distance, it may be advantageous that the UE may configure the macro cell as the C-cell or the primary cell and the small cell may configure the small cell as the U-cell or the secondary cell in order to prevent the handover which excessively frequently occurs.

Due to such a reason, the macro cell as the primary cell of the UE may be continuously connected with the UE.

Meanwhile, in FIGS. 9a and 9b, it is illustrated that the UE is dually connected with the eNodeB of the macro cell and the eNodeB of the small cell, but the present invention is not limited thereto. For example, the UE may be dually connected to first eNodeB for a first small cell (alternatively, a group of the first small cells) and second eNodeB for a second small cell (alternatively, a group of the second small cells).

When all examples given above are considered, eNodeB for the primary cell (Pcell) may be referred to as master eNodeB (hereinafter, referred to as MeNB). In addition, eNodeB for only the secondary cell (Scell) may be referred to as secondary eNodeB (hereinafter, referred to as SeNB).

A cell group including the primary cell (Pcell) by the MeNB may be referred to as a master cell group (MCG) and a cell group including the secondary cell (Scell) by the SeNB may be referred to as a secondary cell group (SCG).

Meanwhile, as described above, in a next system, a situation may be considered, in which the UE transmits/receives a control signal/control data to/from a plurality of cells or cell groups in which geographical locations are different from each other. For example, a type may be considered, in which the UE is simultaneously connected to the MCG including the primary cell which processes RRC connection and a voice and the SCG including the small cells for increasing data processing. In this case, the scheduling information may not be dynamically shared among the plurality of cells or cell groups in which the geographical locations are different from each other and scheduling may be independently performed. In this case, it may be considered that the UE independently transmits the UCI to each corresponding cell. In other words, it may be considered that the UE transmits the UCI for the MCG to the MeNB and transmits the UCI for the SCG to the SeNB.

However, when the subframe in which the PUCCH/PUSCH including the UCI for the MeNB is transmitted and the subframe in which the PUCCH/PUSCH including the UCI for the SeNB is transmitted partially overlap with each other, a problem may occur.

In respect to a similar problem situation, in the existing system, final transmission power of all or some uplink channels is scaled down according to maximum transmission power of the UE. A criterion for determining channels to be reduced follows a priority rule in which a type of the channel, a cell index, and the like are considered. As one example, under a situation in which the PUCCH and the PUSCH are simultaneously transmitted to a predetermined cell on any one subframe, according to the existing system, power assignment and scale-down are performed in the order of the PUCCH, the PUSCH including the UCI, and the residual PUSCH according to Pcmax. Further, according to the existing system, some uplink channels may be dropped according to simultaneous transmission performance of the UE or simultaneous transmission related parameter configuration from the higher layer and in this case, the corresponding channel is selected according to the priority rule. As one example, when the HARQ-ACK and the CSI are configured to be simultaneously transmitted, in the case where the HARQ-ACK and the CSI collide with each other in the same subframe, the CSI is dropped.

However, as described above, in the next system, the UCI may be separately transmitted for each cell group and the priority rule needs to be changed while the RRC connection configuration of only some cell groups is managed. Hereinafter, disclosures of the present specification will be described.

<First Disclosure of Present Specification>

The first disclosure of the present specification presents a method that configures and applies a plurality of priority rules (alternatively, modes).

Under the dual-connectivity situation, the primary cell (Pcell) (e.g., the macro cell) takes charge of the RRC connection configuration and reconfiguration and takes charge of a voice call in that the primary cell is differentiated from the secondary cell. A meaning that the primary cell takes charge of the RRC connection configuration and reconfiguration may be construed as a meaning that (E)PDCCH, PDSCH, and PUSCH which may be transmitted during a process of configuring or changing the RRC connection are transmitted only through the corresponding primary cell (Pcell) (e.g., the macro cell). Further, a meaning that the primary cell takes charge of the voice call may be construed as a meaning that a combination of DL SPS PDSCH and UL SPS PUSCH are transmitted only through the primary cell (e.g., the macro cell) for the purpose of supporting voice over LTE (VoLTE). In this case, a case in which the UCI including the HARQ-ACK, the CSI, the SR, and the like corresponds to the primary cell (Pcell) (e.g., the macro cell) may be considered to be more important than a case in which the UCI corresponds to the secondary cell (Scell) (e.g., the small cell) and this may be considered even when the priority rule for the dual connectivity is configured. However, even when the secondary cell (e.g., the small cell) is operated for the purpose of boosting the data processing, restriction (e.g., dropping or power scale-down) of the UCI (the HARQ-ACK, the CSI, and the like) may degrade performance or decrease efficiency. As a result, it may be considered that the priority rule is configured and applied independently (to be different) for each subframe or for each section of the subframe. By a more detailed method, the cell may configure a first priority rule (alternatively, a first mode) and second priority rule (alternatively, a second mode) and configure the subframe or the subframe section to which each priority rule (alternatively, mode) will be applied for the UE through the higher layer signal. When the UE does not obtain the configuration for the priority rule (alternatively, the mode) which will be applied to the subframe or the subframe section, the UE may apply one priority rule (alternatively, mode). This will be described in more detail with reference to the drawings.

Figure 10:
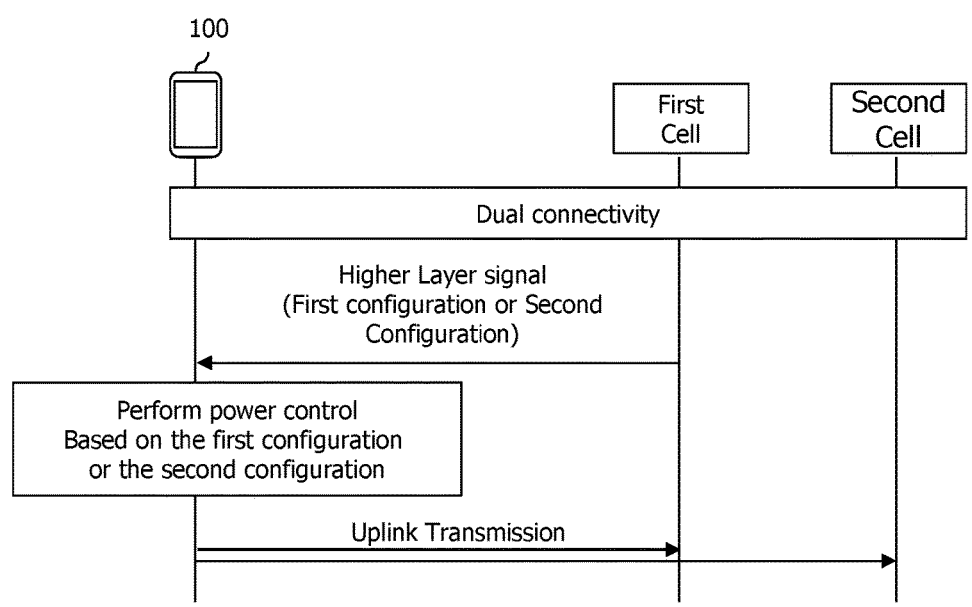
FIG. 10 is an exemplary diagram illustrating one method according to a first disclosure of the present specification.
Figure 11A:
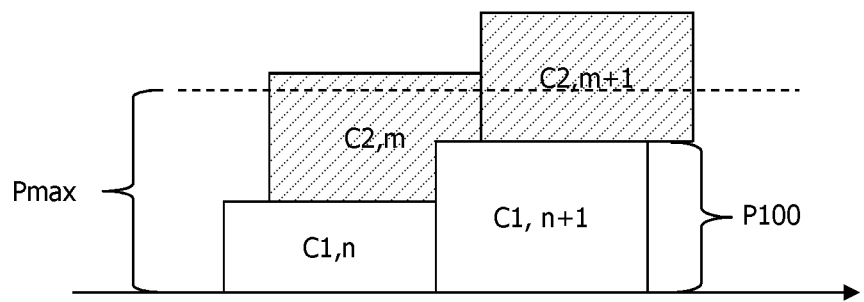
FIGS. 11*a* to 11*e* illustrate one example for power control in a situation in which subframes are asynchronous among eNodeBs.
Figure 11B:
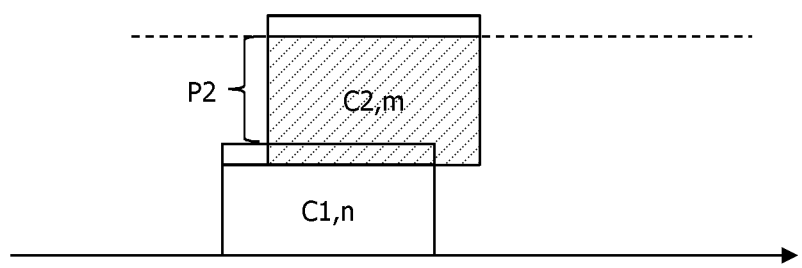
Figure 11C:
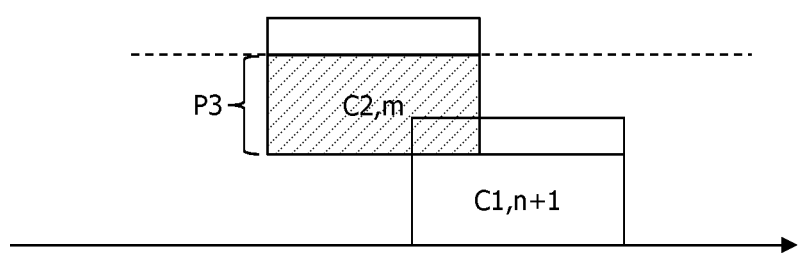
Figure 11D:
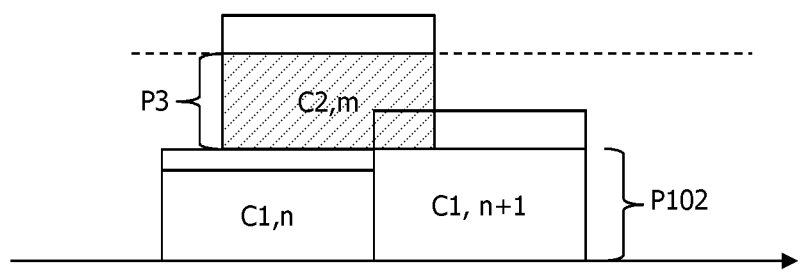
Figure 11E:
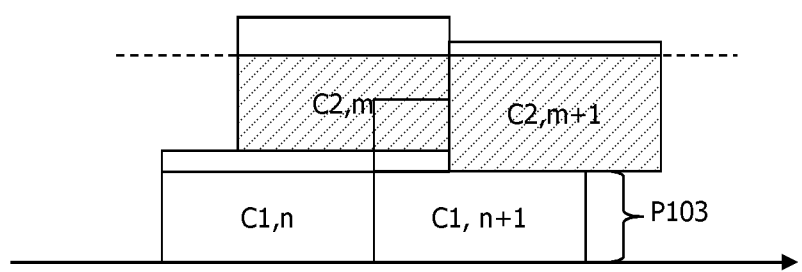

FIG. 10 is an exemplary diagram illustrating one method according to a first disclosure of the present specification.

As seen with reference to FIG. 10, UE 100 has dual connectivity with a first cell and a second cell. In such a situation, the UE 100 receives a higher layer signal from the first cell. The higher layer signal includes any one of a first configuration and a second configuration. Herein, the first configuration may mean a first priority rule (alternatively, a first mode) and the second configuration may represent a second priority rule (alternatively, a second mode).

Then, the UE 100 performs power adjustment based on the first configuration or the second configuration and performs uplink transmission based on the power.

As one example of utilization, in a section in which the second priority rule (alternatively, the second mode) of configuring a priority of the primary cell (Pcell) (e.g., the macro cell) high, the RRC configuration or the voice call is performed, and as a result, performance of the corresponding operation may be maximized and in a section in which the first priority rule (alternatively, the first mode) of configuring the priority of the secondary cell (Scell) (e.g., the small cell) high, data communication such as FTP, or the like is performed, and as a result, boosting data processing increase may be performed. A basic operation of the UE may follow the second priority rule (alternatively, the second mode) of configuring the priority of the primary cell (Pcell) (e.g., the macro cell) high so as to focus on an initial RRC configuration.

Hereinafter, detailed methods will be described.

1. Configuration and Application Method of First Priority Rule (Alternatively, First Mode)

Fundamentally, the high priority may not be unconditionally configured with respect to the primary cell (PCell) (e.g., the macro cell) or the cell group (e.g., the MCG) including the primary cell, but the priority may be configured based on other factors (e.g., a UCI type, a power level, a type of the channel, a UCI size, a frame structure type, a CP length, and the like). Under a situation in which the priorities are the same as each other, it may be considered that the priority is configured according to information on the cell, e.g., a cell index, a type (e.g., eNodeB of the macro cell or eNodeB of the small cell) of eNodeB of the corresponding cell, whether the corresponding cell corresponds to a cell in which PUCCH transmission is available, and the like.

As one example, the priority may be configured according to the UCI type regardless of the transport channel (PUCCH or PUSCH). By a more detailed method, the HARQ-ACK, the SR, the aperiodic CSI, the aperiodic SRS, the periodic CSI, and the periodic SRS may be configured to have higher priorities in the order thereof. In this case, when the UCI is configured by a plurality of combinations, power scaling and abandonment are determined based on a combination having a highest priority. As one example, under a situation in which the HARQ-ACK and the periodic CSI are simultaneously transmitted, the power scaling and the abandonment may be determined based on the HARQ-ACK having the highest priority. In more distinctive, when the HARQ-ACK corresponds to a common search space (CSS), the HARQ-ACK may be configured to have a higher priority than other HARQ-ACK or PRACH. The HARQ-ACK corresponding to the CSS may be limited with respect to the primary cell (PCell).

In the enumerated priority rules, the priority of the SPS PUSCH may be distinctively configured to be high and a detailed example thereof will be described below.

As a first example, the priority may be configured in the order of PUCCH/PUSCH<SPS PUSCH<=HARQ-ACK including the CSI and/or PUCCH/PUSCH including the SR.

A second example is PUCCH/PUSCH including SPS PUSCH=CSI.

A third example is PUSCH including SPS PUSCH=aperiodic CSI.

The SPS PUSCH may be a case in which the SPS PUSCH may be used for a voice communication purpose (including even a partial case in which the SPS PUSCH is not actually used) or a case in which the SPS is configured only for a specific cell.

Thereafter, a detailed priority may be configured based on the information on the cell according to the same priority and a detailed example of the priority rule depending on the information on the cell will be described below. In the example given below, a super secondary cell (Super SCell) may indicate the secondary cell (SCell) transmitting the UCI or receiving the PUCCH among the secondary cells in the secondary cell group (SCG). The super secondary cell (super SCell) may be referred to as PSCell. This may correspond to small eNodeB. In addition, the secondary cell group (SCG)

means a set of cells which are carrier-aggregated (CA) in the super secondary cell (e.g., the small eNodeB) and the primary cell group (PCell group) means the primary cell and a set of cells which are carrier-aggregated (CA) in the eNodeB providing the primary cell. The primary cell group (PCell group) may be referred to as the master cell group (MCG). Ideal backhaul may be assumed among the cells carrier-aggregated by the same eNodeB and the ideal backhaul may not be anticipated among cells corresponding to different eNodeBs.

As a first exemplary priority, the primary cell (PCell)>the super secondary cell (alternatively, PSCell)>the secondary cell (e.g., the secondary cell of the small eNodeB) corresponding to the secondary cell group (SCG)>=the secondary cells (e.g., the secondary cells of Macro eNodeB) corresponding to the primary cell group (alternatively, the MCG).

As a second exemplary priority, the primary cell (PCell)>the super secondary cell (alternatively, PSCell)>the secondary cells (e.g., the secondary cell of the macro eNodeB) corresponding to the primary cell group (alternatively, MCG)>=the secondary cells (e.g., the secondary cells of the small eNodeB) corresponding to the SCG.

As a third exemplary priority, the primary cell (PCell)>the secondary cells corresponding to the primary cell group (alternatively, MCG)>the super secondary cell (alternatively, PSCell)>=the secondary cells (e.g., the secondary cells of the small eNodeB) corresponding to the SCG.

In configuring a first priority rule (alternatively, a first mode), an exception for a specific situation or condition may be additionally considered in order to configure the priorities of some physical channels of the MCB (alternatively, MeNB or PCell) to be high. Referring to the first priority rule (alternatively, the first mode), the priorities of all or some channels of the MCG may be configured to be higher than the SCG in the following situation. As one example, although the PUCCH including the HARQ-ACK is transmitted through the SCG and the PUSCH not including the UCI is transmitted through the MCG, the priority of the PUSCH for the MCG may be configured to be higher than the priority of the HARQ-ACK PUCCH for SCG under exemplary situations enumerated below.

A first exemplary situation may include a situation in which the PDCCH including the UL grant for the channel (e.g., the PUSCH) corresponding to the MCG is transmitted. Herein, the case in which the PDCCH is transmitted in the CSS may mean that the PDCCH scrambled with a common C-RNTI is transmitted or mean that a physical resource mapping location of the PDCCH is the CSS. A case in which the channel corresponding to the MCG is the PUCCH (in particular, the HARQ-ACK) may include even a case in which the PDCCH corresponding to the UCI of the corresponding PUCCH corresponds to the CSS.

A first exemplary situation may include a situation in which the power is set to a minimum power value or more, which is set previously or on the higher layer at the time of performing the power scaling for the channel (e.g., the PUSCH) corresponding to the MCG. In this case, the PUCCH for the SCG may be dropped or power-scaled and the priority of the PUSCH for the MCG may be configured to be higher than the priority of the PUCCH for the SCG.

A third exemplary situation may include a situation in which the priority is reconfigured according to a transmission mode of the uplink grant for the channel (e.g., the PUSCH) corresponding to the MCG. Herein, the transmission mode of the uplink grant may be divided according to a scrambling sequence, CRC masking or a specific value for a new field or a specific combination of some existing field values.

As a fourth exemplary situation, in the case where minimum power for the channel (e.g., the PUCCH) corresponding to the SCG is predetermined or determined according to the higher layer signal, when the power of the channel for the corresponding SCG is equal to or less than or less than the minimum power value, the priority of the channel for the MCG is configured to be high.

2. Configuration and Application Method of Second Priority Rule (Alternatively, Second Mode)

Fundamentally, the priority for the primary cell (PCell) or the primary cell group (that is, the MCG) is configured to be the highest. However, the SRS for the primary cell (PCell) or the primary cell group (that is, the MCG) may be excluded. In this case, in the UE, when transmission of an uplink channel for a plurality of cells requires power of Pcmax, the power scaling (e.g., down-scaling) may not be performed with respect to the channel for the primary cell (PCell) or the primary cell group (that is, the MCG). The following channels may not correspond to the above channels. The PUSCH which does not include the SRS and the UCI and does not correspond to a grant in the random access response (PAR) or retransmission for the random access procedure. The reason is to protect RRC configuration and reconfiguration or primary communication such as the voice communication. Alternatively, when the priority for the primary cell (PCell) or the primary cell group (that is, the MCG) is configured to be the highest, the channel which is not power-scaled may be the PRACH/PUCCH/SPS PUSCH. In other words, only when the PRACH, PUCCH, or SPS PUSCH is transmitted to the primary cell (PCell) or the primary cell group (that is, the MCG), the priority may be given to the corresponding channel the first priority rule (alternatively, the first mode) may be applied to the residual channels. In this case, when the priority is given, a case in which the power-scaling is not performed may be assumed. Thereafter, the operation according to the first priority rule (alternatively, the first mode) may be considered with respect to the residual cell. In the above description, when the cell having the highest priority is limited to the primary cell in the primary cell group (that is, the MCG), the first priority rule (alternatively, the first mode) may be applied to the residual channels. Additionally, in a similar method, a third priority of configuring the priority (continuously or with respect to a specific UCI or channel) for the super secondary cell (SCell) or PSCell instead of the primary cell (PCell) or the primary cell group (that is, the MCG) may be considered.

In more detail, the power scaling among the cell groups or the transmission dropping of the channel may be determined based on the following priority set at the time of determining the power scaling among the cell groups or the transmission dropping of the channel. In this case, whether the power scaling is performed and whether the priority for MeNB is configured to be high may be determined for each set.

Set 0: PRACH
Set 1: SR, HARQ-ACK
Set 2: aperiodic CSI, periodic CSI
Set 3: SPS PUSCH
Set 4: PUSCH without UCI (UL-SCH)
Set 5: SRS
Set 6: D2D channels According to the indexes of the sets, it may be assumed that the lower the index is, the higher, the priority is.

Alternatively, it may be considered that set 0 and set 1 have the same priority, set 2 and set 3 have the same priority, set 1 and set 2 have the same priority, or set 1, set 2, and set 3 have the same priority. In the case of the set 1, in more detail, it may be considered that the SR has the higher priority than the HARQ-ACK. The SR may be limited to the positive SR. As one example, when the UE transmits only the HARQ-RACK to the MCG by using PUCCH format 3 and transmits the HARQ-ACK and the SR to the SCG through the PUCCH format, it may be considered that the higher priority is given to the SCG in the case of the positive SR and the high priority is given to the MCG in the case of the MCG. When the SR is transmitted through the PUCCH format 1/1a/1b, since the PUCCH is not transmitted or the PUCCH is transmitted through the HARQ-ACK resource in the case of the SR, it may be construed that the SR is not transmitted. In the above description, the power scaling may not be performed with respect to a combination {set 0, set 1}, {set 0, set 1, set 2}, or {set 0, set 1, set 2, set 3}. In this case, when power to be allocated is short, it may be considered that the UE drops transmission of the corresponding channel. When the power remains by dropping the transmission of the corresponding channel, it may be considered that the remaining power is allocated to a channel having the second highest priority and it may be considered that the remaining power is not used. Fundamentally, when different cell groups (MCG and SCG) correspond to the same set or when the different cell groups correspond to the same priority set, the high priority may be given to the MCG or the primary cell (PCell). In the above description, it may be considered that the priority configuration is applied with respect to a combination {set 2, set 3, set 4, set 5}, {set 2, set 3, set 4}, {set 4, set 5}, or {set 4} equally or by giving a weight for each set without distinguishment at the time of the power scaling for a simple operation. Herein, it may be limited that the weight is predetermined or set on the higher layer according to the sets or a group of the priority sets. When the channel corresponding to the set 5 collides with the residual channels other than the set 5, it may be considered that transmission of the channel corresponding to the set 5 is dropped. In a subsequent process, the power scaling may be performed or the transmission of the corresponding channel may be dropped according to an Rel-11 principle.

For example, when it is assumed that the set 1 and the set 2 have the same priority, the following priority rule may be considered.

The PRACH to be transmitted to the MeNB has the highest priority

The PRACH has the highest priority than other channels regardless of destination eNB The PUSCH including the PUCCH or UCI to be transmitted to the MeNB has the higher priority than the PUSCH including the PUCCH or the UCI to be transmitted to the MeNB The PUSCH including the PUCCH or UCI has the higher priority than the PUSCH not including the UCI or SRS The power scaling may not be performed with respect to the PUSCH including the PUCCH or the UCI. The same power scaling (alternatively, power scaling to which the weight is applied) may be performed with other channels.

A table given below is a table in which priority configuration is organized when heterogeneous eNBs collide with each other.

TABLE 7

|  |  | MeNB |  |  |  |  |  |
|---|---|---|---|---|---|---|---|
|  |  | Set 0 | Set 1 | Set 2 | Set 3 | Set 4 | Set 5 |
| SeNB | Set 0 | MeNB | Option 1: MeNB Option 2: SeNB | Option 1: MeNB Option 2: SeNB | Option 1: MeNB Option 2: SeNB | Option 1: MeNB Option 2: SeNB | SeNB |
|  | Set 1 | MeNB | Option 1: MeNB Option 2: SeNB | Option 1: MeNB Option 2: SeNB | Option 1: MeNB Option 2: SeNB | Option 1: MeNB Option 2: SeNB | SeNB |
|  | Set 2 | MeNB | Option 1: MeNB Option 2: SeNB | Option 1: MeNB Option 2: SeNB | Option 1: MeNB Option 2: SeNB | Option 1: MeNB Option 2: SeNB | SeNB |
|  | Set 3 | MeNB | Option 1: MeNB Option 2: SeNB | Option 1: MeNB Option 2: SeNB | Option 1: MeNB Option 2: SeNB | Option 1: MeNB Option 2: SeNB | SeNB |
|  | Set 4 | MeNB | Option 1: MeNB Option 2: SeNB | Option 1: MeNB Option 2: SeNB | Option 1: MeNB Option 2: SeNB | Option 1: MeNB Option 2: SeNB | SeNB |
|  | Set 5 | MeNB | MeNB | MeNB | MeNB | MeNB | Option 1: Equal Option 2: MeNB |

Among the detailed options shown above, an option to configuring the priority for the MeNB high, that is, option 1 may be fundamentally considered. However, set 4 of the MeNB may have a lower priority than set 0, set 1, set 2, and set 3 of the SeNB. Alternatively, when the channel to be transmitted to the MeNB and the channel to be transmitted to the SeNB correspond to the same set, the channel to be transmitted to the MeNB may have the higher priority. Alternatively, when the channels to be transmitted to the MeNB correspond to a plurality of sets, the channels to be transmitted to the MeNB may have the higher priority. Matters are enumerated below, which may be considered together with the criterion.

In the case of set 1, the higher priority may be given to only the SR to be transmitted to the SeNB according to the higher layer signal. When the channel to be transmitted to the MeNB corresponds to set 1 and similarly, the channel to be transmitted to the SeNB also corresponds to set 1, the SR may not be transmitted among the channels to be transmitted to the MeNB. In this case, the SR which is not transmitted may be the negative SR. The higher layer signal may be referred to as the priority of the SeNB for the SR and may be a parameter associated with bearer split in an MAC layer. As one example, when the bearer is assigned only to the SeNB, the SR for the SeNB may be configured to be higher than the HARQ-ACK of the MeNB. In this case, the SR may the positive SR.

When the channel to be transmitted to the MeNB corresponds to SET 5 and similarly, the channel to be transmitted to the SeNB also corresponds to set 5, the same priority may be used.

A table given below is a table in which when a plurality of channels is transmitted for each eNB, the priority configuration between the eNBs is organized.

example of configuring the priorities for the PUCCH and the UL SPS PUSCH will be described.

As a first option, a priority order is determined according to the UCI included in the PUCCH. As a more detailed example, the priorities are configured in the following order.

As a first example of the first option, PUCCH including the periodic CSI<the UL SPS PUSCH<=the PUCCH including the HARQ-ACK/SR As a second example of the first option, the PUCCH including the periodic CSI<PUCCH including the HARQ-ACK/SR<the UL SPS PUSCH As a third example of the first option, the UL SPS PUSCH<the PUCCH including the periodic CSI<the PUCCH including the HARQ-ACK/SR In the above examples, only the PUCCH including the positive SR does not include the SR and may have the higher priority than the PUCCH including the HARQ-ACK.

As a second option, the priority for the primary cell (PCell) in the primary cell group (that is, the MCG) is configured to be the highest. The second option may be used

TABLE 8

|  |  | MeNB | | | | |
| --- | --- | --- | --- | --- | --- | --- |
|  |  | PRACH | PUCCH | PUSCH | PUCCH/PUSCH | PUCCH/PUSCH/SRS |
| SeNB | PRACH | Table 7 | Table 7 | Table 7 |  | Transmission drop of the SRS ==> According to Table 7. Further, power scaling of the PUSCH |
|  | PUCCH | Table 7 | Table 7 | Table 7 | According to Table 7. Further, power scaling of the PUSCH | Transmission drop of the SRS ==> According to Table 7. Further, power scaling of the PUSCH |
|  | PUSCH | Table 7 | Table 7 | Table 7 | According to Table 7. Further, power scaling of the PUSCH | Transmission drop of the SRS ==> According to Table 7. Further, power scaling of the PUSCH |
|  | PUCCH/PUSCH | PRACH > PUCCH Further, power scaling of the PUSCH | According to Table 7. Further, power scaling of the PUSCH | According to Table 7. Further, power scaling of the PUSCH | According to Table 7. Further, power scaling of the PUSCH | Transmission drop of the SRS ==> According to Table 7. Further, power scaling of the PUSCH |
|  | PUCCH/PUSCH/SRS | Transmission drop of the SRS ==> PRACH > PUCCH Further, power scaling of the PUSCH | Transmission drop of the SRS ==> According to Table 7. Further, power scaling of the PUSCH | Transmission drop of the SRS ==> According to Table 7. Further, power scaling of the PUSCH | Transmission drop of the SRS ==> According to Table 7. Further, power scaling of the PUSCH | Transmission drop of the SRS ==> According to Table 7. Further, power scaling of the PUSCH |

The following description is a detailed example for a method for configuring the priorities among the channels to be transmitted to the PCell or the primary cell group (that is, MCG). The following priority rule may be considered at the time of configuring the power of the channels to be transmitted to the PCell or at the time of applying a rule for dropping the channel to be transmitted to the PCell.

2.1 PUSCH와 PUCCH

Using the UL SPS PUSCH may be considered for the purpose of supporting the voice communication and in this case, it may be considered that the priority of the corresponding PUSCH is configured to be high. Next, one for a case in which the priority for the primary cell group (that is, the MCG) is configured to be high and the number of cells in the primary cell group (that is, the MCG) is multiple.

Herein, when the PUCCH includes the HARQ-ACK/SR, it is not excluded that the PUCCH includes even the periodic CSI, but when the PUCCH includes the periodic CSI, the PUCCH may include only the periodic CSI. It may be considered that the priority rule of the existing 3GPP Rel-12 is followed with respect to the PUSCH other than the UL SPS PUSCH of the corresponding cell.

2.2 PUSCH and PUSCH

Contents described below relate to the case in which the priority of the primary cell group (that is, the MCG) is configured to be high. The Macro eNodeB may aggregate the plurality of cells and in this case, the priority rule according to the existing 3GPP Rel-12 may be just applied and the priority for the SPS PUSCH may be reconfigured for the purpose of protecting the voice communication. Next, one example of configuring the priorities for the UL SPS PUSCH and the PUSCHs of other cells of the primary cell group (that is, the MCG) will be described.

As a first method, the priority order is determined according to the presence or the type of the UCI included in the PUSCH. As a more detailed example, the priorities are configured in the following order.

As a first option of the first method, the PUSCH including the periodic CSI<the UL SPS PUSCH<the PUSCH including the aperiodic PUSCH As a second option of the first method, the PUSCH including the periodic/aperiodic CSI<the UL SPS PUSCH<=the PUSCH including the HARQ-ACK As a third option of the first method, the PUSCH including the HARQ-ACK<the UL SPS PUSCH As a second method, the priority order is determined based on the UL-SCH included in the PUSCH and the number of assigned RBs. As a more detailed example, when coding rate of the PUSCH is lower than coding rate of the UL SPS PUSCH by a predetermined threshold or more, the priority of the UL SPS PUSCH is configured to be high.

As a third method, the priority of the channel for the PCell in the primary cell group (that is, the MCG) is configured to be the highest. In this option, the priority for the primary cell group (that is, the MCG) is configured to be high and this option may be limited to the case where the number of cells in the primary cell group (that is, the MCG) is multiple.

<Second Disclosure of Present Specification>

The second disclosure of the present specification presents a method that guarantees minimum power for each eNodeB, for each cell group, or for each cell.

In a next system, configuring power which the UE may minimally guarantee may be introduced in order for the UE to guarantee transmission to each eNodeB (alternatively, each cell group or a specific cell in each cell group) while dual connectivity. As one example, when the UE is configured with transmission power to a second eNodeB as Pcmin2, even though a priority of a first eNodeB is configured to be high, it may be considered that the transmission power to the second eNodeB is configured as at least Pcmin2 or more. Each eNodeB/cell group/cell may determine and announce power or a power value for each channel which the UE may minimally guarantee.

In this case, the power or the power value for each channel is included in a consideration target in power control (e.g., power scaling or transmission dropping) for the UL channels transmitted to the first eNodeB and the second eNodeB according to the configured UE minimum power.

1. Case Where Minimum Transmission Power (Minimum UE Transmission Power) for First eNodeB (e.g., MeNB) is Configured In dual connectivity, the MeNB takes charge of RRC connection configuration, mobility handling, and the like, and as a result, in general, the priority of an uplink channel for the MeNB may be configured to be higher than the priority of the uplink channel for the SeNB. Further, the uplink channel may correspond to for example, PRACH, PUCCH, SPS, PUSCH, and PUSCH including UCI. This may be used for reserving the minimum UE transmission power for the MeNB in order to guarantee transmission performance of all or some of the uplink channels to the MeNB. Herein, when a value of power actually scheduled by the MeNB is smaller than the minimum UE transmission power, the scheduled power value may be used instead of the minimum UE transmission power.

When final transmission power (a total sum of power for each channel) of at least one of the MCG and the SCG is smaller than the minimum UE transmission power P_xeNB initially configured for each eNodeB, it is may be considered that residual power (e.g., P_CMAX−P_MeNB or P_CMAX−P_SeNB) is assigned to other cell groups. In this case, other cell groups may assign the minimum transmission power with the residual power (P_CMAX-total allocated power to the other eNodeB) as the upper limit. In this case, after the UE configures the assigned power with maximum power which may be used thereby, the UE may assign the power to each channel by applying the rule according to the existing Rel-11. In this case, in a situation in which timings do not synchronize with each other, for example, a situation in which two subframes overlap with each other, a value of power which is not used throughout two subframes needs to become a minimum value. That is, min{P_CMAX(I,k)−P_alloc_xeNB(k), P_CMAX(I, k+1)−P_alloc_xeNB(k+1)} may be used. The UE may operate a power scaling method in a power limit situation (when total UE power is more than Pcmax) by the following mode. In the embodiment, the first eNodeB will be described as the MeNB and the eNodeB2 will be described as the SeNB for easy description.

As a first example, UE transmission power for transmitting the PUSCH is configured as the minimum power. In this case, the transmission of the PUSCH may correspond to retransmission. Further, herein, the PUSCH may not include a PUSCH corresponding to the SPS PUSCH or the random access procedure. As one example, the PUSCH corresponding to the random access procedure may be configured as the minimum power or more even in the power limit.

As a second example, when the uplink channel (the uplink channel on all subframes or some subframes by considering an overlapped part in the situation in which the timings do not synchronize with each other) transmitted to the SeNB corresponds to {Set 0, Set 1, Set 2, Set 3}, {Set 0, Set 1, Set 2}, or {Set 0, Set 1}, the UE transmission power for the PUSCH to be transmitted to the MeNB is configured as the minimum power. In this case, the PUSCH for the MeNB may be retransmitted.

2. Case Where Minimum UE Transmission Power for Second eNodeB (e.g., SeNB) is Configured When the priorities for all or some uplink channels to be transmitted to the MeNB are configured to be high in the dual connectivity, the power is scaled so that the uplink channel (e.g., including the PUCCH to the PSCell) for the SeNB is transmitted with excessively low power, and as a result, spectral efficiency may deteriorate. As a countermeasure therefor, it may be considered that the minimum UE transmission power is configured with respect to all or some uplink channels for the SeNB and the minimum UE transmission power is guaranteed. For example, when the total power value actually scheduled by the second eNodeB is smaller than the minimum UE transmission power configured with respect to the second eNodeB, the corresponding value may be substituted with the minimum UE transmission power value. When final transmission power (a total sum of power for each channel) of at least one of the MCG and the SCG is smaller than the minimum UE transmission power P_xeNB initially configured for each eNodeB, it is may be considered that residual power (e.g., P_CMAX−P_MeNB or P_CMAX−P_SeNB) is assigned to other cell groups. In this case, other corresponding cell groups may assign the minimum transmission power with the residual power (P_CMAX-total allocated power to the other eNodeB) as the upper limit. In this case, in a situation in which timings do not synchronize with each other, for example, a situation in which two subframes overlap with each other, a value of power which is not used throughout two subframes needs to become a minimum value. That is, min{P_CMAX (I,k)−P_alloc_xeNB(k), P_CMAX(I, k+1)−P_alloc_xeNB (k+1)} may be used. Next, one detailed example of a method for the UE to transmit the power in the power limit situation will be described. In the embodiment, the first eNodeB will be described as the MeNB and the eNodeB2 will be described as the SeNB for easy description.

As a first example, the minimum power or more is configured with respect to all or some of the uplink channels transmitted to the SeNB. Herein, the uplink channel may correspond to {Set 0, Set 1, Set 2, Set 3}, {Set 0, Set 1, Set 2}, or {Set 0, Set 1}. In this case, the power scaling may be performed in order to guarantee the minimum power even in the uplink channel having the high priority. As one example, even when the priority of the PUSCH including the UCI to be transmitted to the MeNB is configured to be higher than the priority of the PUCCH including the HARQ-ACK to be transmitted to the SeNB, the UE may perform the power scaling with respect to the uplink channel of the MeNB in order to guarantee the minimum power of the SeNB in the power limit situation.

As a second example, the minimum power or more is configured with respect to all or some of the uplink channels to be transmitted to the SeNB. Herein, the uplink channel may correspond to {Set 0, Set 1, Set 2, Set 3}, {Set 0, Set 1, Set 2}, or {Set 0, Set 1}. For example, when the uplink channels transmitted to the MeNB are the PRACH, the PUCCH, the PUSCH including the UCI, and the PUSCH, the minimum transmission power for the SeNB may not be guaranteed. However, herein, the SPS PUSCH may be excluded. As one example, when the UE intends to transmit the PUCCH to the SeNB and transmits the PUSCH including the UCI to the MeNB, the uplink channel for the SeNB may not be transmitted or the transmission power may be configured to be lower than the minimum transmission power.

As a third example, the transmission power of the uplink channel to the SeNB may be continuously reserved as the minimum power or more. Herein, the minimum power may be configured for each specific channel. The specific channel may be correspond to {Set 0, Set 1, Set 2, Set 3}, {Set 0, Set 1, Set 2}, or {Set 0, Set 1}. In this case, even when the transmission of the uplink channel to the SeNB is not actually performed, the power which may be maximally used by the MeNB does not exceed a limited value of the minimum power in the Pcmax.

As a subsequent operation, according to the priority rule, the UE may perform power scaling/dropping.

3. Case Where Minimum UE Transmission Power for First eNodeB and Second eNodeB is Simultaneously Configured It may be considered that the minimum UE transmission power is configured with respect to both eNodeBs by a method for protecting coverage of the MeNB and maximizing spectral efficiency by the SeNB in the dual connectivity. When a value of total power actually scheduled by each eNodeB is smaller than the minimum UE transmission power, the corresponding value may be substituted with the value of the corresponding minimum UE transmission power. Herein, when the final transmission power (the total sum of the power for each cahnnel) of at least one of the MCG and the SCG is smaller than the minimum UE transmission power P_xeNB initially configured fro each eNodeB, the residual power (e.g., P_CMAX−P_MeNB or P_CMAX−P_SeNB) may be assigned to other cell group and in this case, the corresponding other cell group may assign the final transmission power with the residual power (P_CMAX-total allocated power to the other eNodeB) as the upper limit. The assigned power may be configured to maximum power which may be used by the UE and thereafter, the power may be assigned to each channel by applying the rule according to Rel-11. In this case, in the situation in which the timing is not synchronized, for example, the situation in which two subframes overlap with each other, the value of the power which is not used throughout two subframes needs to become the minimum value. That is, min{P_CMAX(I,k)−P_alloc_xeNB(k), P_CMAX(I, k+1)−P_alloc_xeNB(k+1)} may be used. Next, one detailed example of a method for the UE to scale the power in the power limit situation will be described. In this case, it may be assumed that request power for each cell group is larger than P_xeNB. In the embodiment, the first eNodeB will be described as the MeNB and the eNodeB2 will be described as the SeNB for easy description.

As a first example, the power of the uplink channel for each eNodeB is configured as large as the configured minimum transmission power. Thereafter, the residual power (that is, the value obtained by subtracting the sum of the respective minimum power from Pcmax) is evenly assigned to the MeNB and the SeNB. The assignment may include reserving the corresponding power when there is no uplink transmission.

As a second example, the power of the uplink channel for each eNodeB is configured as large as the configured minimum UE transmission power. Thereafter, the residual power (that is, the value obtained by subtracting the sum of the respective minimum power from Pcmax) is unevenly assigned to the MeNB and the SeNB according to a ratio of the configured minimum power. The assignment may include reserving the corresponding power when there is no uplink transmission. As one example, when the minimum power for the MeNB is configured to be twice larger than the minimum power for the SeNB, it may be considered that the residual power is additionally assigned to the MeNB double even at the time of assigning the residual power.

As a third example, the power of the uplink channel for each eNodeB is configured as large as the configured minimum UE transmission power. Thereafter, in respect to the residual power (that is, the value obtained by subtracting the sum of the respective minimum power from Pcmax), the power is additionally assigned to the eNodeB or cell having the higher priority according to the priority rule.

Herein, when final configured power of some channels (e.g., the PUCCH and/or PUSCH including the HARQ-ACK) is smaller than P_xeNB (the minimum UE transmission power configured for each cell group) or power initially scheduled by a TPC, and the like and the minimum value of P_CMAX,c, it may be considered that dropping the transmission of the corresponding channel may be additionally considered. In a subsequent operation, the total sum of the power assigned to the channel for each cell group is fixed to the maximum power which may be used in each cell group and thereafter, the priority rule or power scaling rule according to the existing Rel-11 may be applied. Herein, it may be assumed that a case where the sum of the minimum power exceeds the Pcmax does not occur, and in the case, it may be construed that the UE does not operate in the dual connectivity mode. Alternatively, when the sum of the minimum power exceeds the Pcmax, the UE may change the minimum power to P_MeNB=P_MeNB; P_SeNB=P_CMAX-P_MeNB.

The minimum UE transmit power may be a form in which the value configured in the eNodeB is used by the UE as it is, and may be a form in which the value is updated by using the value configured in the higher layer for each subframe and the TPC. The following description is an example of a method of configuring the minimum UE transmit power for each channel (PUSCH, PUCCH).

PUSCH: $P_{PUSCH\_MIN,c}(i) = \min\{P_{CMAX,c}(i), P_{O\_PUSCH,c}(1) + \alpha_c(1) \cdot PL_c + f_c(i)\}$ [dBm]

PUCCH: $P_{PUCCH\_MIN,c}(i) = \min\{P_{CMAX,c}(i), P_{0\_PUCCH,c} + PL_c + g(i)\}$ [dBm]   [Equation 1]

Where, $P_{0\_PUCCH,c}$ is a high layer signal configured only in the PCell in the existing Rel-11, but may be added even in the cell corresponding to the SeNB like the pSCell in the Dual connectivity. As another method, a method of configuring an additional reference format to the UE for each channel may be considered. As an example, the reference format for the PUCCH may be configured to the bit number of HARQ-ACK according to the number of configured cells to the corresponding eNodeB in the PUCCH format 3. Herein, the configured cell is a cell by the MeNB or the SeNB.

In the present disclosure, $\hat{P}$ is referred to as a linear value of the corresponding parameter P.

When the minimum guaranteed UE transmit power is designated to the eNB1 and/or eNB2, each eNB first allocates the UE transmit power to each configured power value or less, and then when the remaining power is allocated, each eNB may transmit the plurality of UL channels. In the same CG, the plurality of UL channels may determine the power allocation sequence according to the Rel-11 priority rule. In addition, the remaining power may be allocated according to the priority rule selected according to the first disclosure. When the minimum guaranteed UE transmit power is indicated as the P_MeNB, P_SeNB for each CG, in only the channel in which the power of the channel transmitted to each CG exceeds the P_MeNB or the P_SeNB, the remaining power is allocated. For example, it is assumed that the PUCCH and the PUSCH are transmitted to the MCG and the PUCCH and the PUSCH are transmitted to even the SCG. In this case, in the case of MCG PUCCH, when the allocated power is smaller than the P_MeNB, and in the case of the SCG PUCCH, when the allocated power is larger than the P_SeNB, the remaining power (in terms of the linear scale, P_CMAX−P_MeNB−P_SeNB in the embodiment) is allocated according to the priority rule, it is performed in the MCG PUSCH, SCG PUCCH, SCG PUSCH In the embodiment described below, for convenience of description, it is assumed that the UL channels to allocate the remaining power have the priority in order of CH1>CH2>CH3>CH4>CH5=CH6. In other words, it is assumed that the channels are arranged according to the priority rule and thereafter, the remaining power is allocated the in the order of the arranged channels. Further, it is assumed that CH1, CH3, and CH5 are transmitted to the MCG and CH2, CH4, and CH6 are transmitted to the SCG.

First, the power of CH1 is configured. The power of the CH1 is the scheduled power constituted by a combination of pathloss, high layer signaled value, TPC command, and the like and a value allocated in the P_MeNB (denoted by $\tilde{P}_{CH1,c}(i)$, a power value allocated to the corresponding channel when allocating the P_xeNB to each CG) of the allocates a limited value and a minimum value between the remaining power to the CH1. Herein, $\tilde{P}_{CH1,c}(i)$ represents an allocated amount when some channels are allocated when allocating the power to each CG by P_MeNB or P_SeNB in the early stages, and accordingly, without the P_MeNB or P_SeNB, the corresponding value is set to 0 and when the corresponding channel exceeds the P_MeNB or P_SeNB value, the corresponding value is designated to P_MeNB or P_SeNB.

First, $\hat{P}_{xeNB}(i) = \min\{\hat{P}_{xeNB}, \hat{P}_{alloc\_by\_TPC}\}$ is allocated for each eNB before allocating the power for each CH. Herein, P_alloc_by_TPC is a sum of all UL schedules (for the target eNB) other than PRACH and SRS allocated to the TPC. That is, the P_alloc_by_TPC means the sum of all the scheduled UL power. Accordingly, if there is no schedule or the power location is lower than P_xeNB, the smaller power may be set. The setting may be applied when the UE notifies information on subframe at the later timing of another eNB.

When the CH1 is the PUCCH as an example, the power setting equation is as follows.

$$\hat{P}_{CH1}(i) = \min\left\{\begin{array}{l}\hat{P}_{CMAX}(i) - \hat{P}_{MeNB}(i) - \hat{P}_{SeNB}(i), \\ \hat{P}_{PUCCH,PCell}(i) - \tilde{\hat{P}}_{CH1,c}(i)\end{array}\right\} + \tilde{\hat{P}}_{CH1,c}(i)$$   [Equation 2]

Herein, $P_{PUCCH,PCell}(i)$ is scheduling power for the PUCCH corresponding to the MCG in SF I and may be a value set according to the existing Rel-11, and has an upper limit of P_CMAX,c. The following equation is expressed.

$$P_{PUCCH}(i) = \min\left\{\begin{array}{l}P_{CMAX,c}(i), \\ P_{0\_PUCCH} + PL_c + h(n_{CQI}, n_{HARQ}, n_{SR}) + \Delta_{F\_PUCCH}(F) + \Delta_{T \times D}(F') + g(i)\end{array}\right\}$$   [Equation 3]

Next, the power of the CH 2 is configured. The power of the CH 2 may configure a value excepting the power of CH1 from the remaining power to the upper limit. Similarly, the power of the CH2 is the scheduled power having the upper limit of P_CMAX,c constituted by a combination of pathloss, high layer signaled value, TPC command, and the like and a value allocated in the P_MeNB (denoted by $\tilde{P}_{CH1,c}(i)$, a power value allocated to the corresponding channel when allocating the P_xeNB to each CG) of the allocates a limited value and a minimum value between the remaining power to the CH2. When the CH2 is the PUCCH as an example, the corresponding setting equation is as follows.

$$\hat{P}_{CH2}(i) = \min\left\{ \begin{array}{l} \min(\hat{P}_{CMAX}(i) - \hat{P}_{MeNB}(i) - \hat{P}_{SeNB}(i) - \hat{P}_{CH1}(i), 0), \\ \hat{P}_{PUCCH,pSCell}(i) - \hat{\tilde{P}}_{CH2,c}(i) \end{array} \right\} + \hat{\tilde{P}}_{CH2,c}(i) \qquad \text{[Equation 4]}$$

Herein, $P_{PUCCH,pSCell}(i)$ is scheduling power for the PUCCH corresponding to the MCG in SF I and may be a value set according to the existing Rel-11, and has an upper limit of P_CMAX,c.

Next, the power of the CH 3 is configured. In the same manner, the power of the CH 3 may configure a value excepting the power of CH1 from the remaining power as the upper limit. In the scheduled power having the upper limit of P_CMAX,c, a value allocated in the P_MeNB (denoted by $\tilde{P}_{CH1,c}(i)$, a power value allocated to the corresponding channel when allocating the P_xeNB to each CG) is not applied to the embodiment. When the CH3 is the PUSCH with UCI as an example, the corresponding setting equation is as follows.

$$\hat{P}_{CH3}(i) = \min\left\{ \begin{array}{l} \min(\hat{P}_{CMAX}(i) - \hat{P}_{MeNB}(i) - \hat{P}_{SeNB}(i) - \hat{P}_{CH1}(i) - \hat{P}_{CH2}(i), 0), \\ \hat{P}_{PUSCH,MCG\_j}(i) - \hat{\tilde{P}}_{CH3,c}(i) \end{array} \right\} + \hat{\tilde{P}}_{CH3,c}(i) \qquad \text{[Equation 5]}$$

Herein, $P_{PUCCH,pSCell}(i)$ is scheduling power for the PUCCH corresponding to the MCG in SF i, may be a value set according to the existing Rel-11, has an upper limit of P_CMAX,c or $10\log_{10}(\hat{P}_{CMAX,c}(i) - \hat{P}_{PUCCH}(i))$ according to whether the PUCCH and PUSCH are simultaneously transmitted in the corresponding serving cell. When the PUCCH and PUSCH are not simultaneously transmitted, $P_{PUCCH,pSCell}(i)$ is expressed by equation 3-1 and when PUCCH and PUSCH are simultaneously transmitted, $P_{PUCCH,pSCell}(i)$ is expressed by Equation 6.

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\} \qquad \text{[Equation 6]}$$

$$P_{PUSCH,c}(i) = \min\left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\} \qquad \text{[Equation 7]}$$

Alternatively, only in the dual connectivity mode UE, $P_{PUCCH,pSCell}(i)$ may be set by Equation 6.

Next, the power of the CH 4 is configured. In the same manner, the power of the CH 4 may configure a value excepting the power of the channel having high priority from the remaining power as the upper limit. In the scheduled power having the upper limit of P_CMAX,c, a value allocated in the P_MeNB (denoted by $\tilde{P}_{CH1,c}(i)$, a power value allocated to the corresponding channel when allocating the P_xeNB to each CG) is not applied to the embodiment. When the CH4 is the PUSCH with UCI as an example, the corresponding setting equation is as follows.

$$\hat{P}_{CH4}(i) = \min\left\{ \begin{array}{l} \min(\hat{P}_{CMAX}(i) - \hat{P}_{MeNB}(i) - \hat{P}_{SeNB}(i) - \hat{P}_{CH1}(i) - \hat{P}_{CH2}(i) - \hat{P}_{CH3}(i), 0), \\ \hat{P}_{PUSCH,SCG\_j}(i) + \hat{\tilde{P}}_{CH4,c}(i) \end{array} \right\} + \hat{\tilde{P}}_{CH4,c}(i) \qquad \text{[Equation 8]}$$

Herein, $P_{PUCCH,pSCell}(i)$ is scheduling power for the PUCCH corresponding to the MCG in SF i, may be a value set according to the existing Rel-11, has an upper limit of P_CMAX,c or $10\log_{10}(\hat{P}_{CMAX,c}(i) - \hat{P}_{PUCCH}(i))$ according to whether the PUCCH and PUSCH are simultaneously transmitted in the corresponding serving cell. When the PUCCH and PUSCH are not simultaneously transmitted, $P_{PUCCH,pSCell}(i)$ may be expressed by Equation 6 and when PUCCH and PUSCH are simultaneously transmitted, $P_{PUCCH,pSCell}(i)$ may be expressed by Equation 7. Alternatively, only in the dual connectivity mode UE, $P_{PUCCH,pSCell}(i)$ may be set by Equation 6.

Next, it is assumed that CH5 and CH6 have the same priority and may be included in the same CG unlike the embodiment. For example, when the CH5 and CH6 are the PUSCH without UCI as an example, the corresponding power setting equation is as follows.

$$\sum_{c \neq MCG\_j, SCG\_j} w(i) \cdot \hat{P}_{PUSCH,c}(i) \leq \qquad \text{[Equation 9]}$$
$$\min(\hat{P}_{CMAX}(i) - \hat{P}_{MeNB}(i) - \hat{P}_{SeNB}(i) - \hat{P}_{CH1}(i) - \hat{P}_{CH2}(i) - \hat{P}_{CH3}(i) - \hat{P}_{CH4}(i), 0)$$

Herein, $P_{PUCCH,pSCell}(i)$ is scheduling power for the PUCCH corresponding to the MCG in SF i, may be a value set according to the existing Rel-11, has an upper limit of P_CMAX,c or $10\log_{10}(\hat{P}_{CMAX,c}(i) - \hat{P}_{PUCCH}(i))$ according to whether the PUCCH and PUSCH are simultaneously transmitted in the corresponding serving cell. When the PUCCH and PUSCH are not simultaneously transmitted, $P_{PUCCH,pSCell}(i)$ may be expressed by Equation 6 and when PUCCH and PUSCH are simultaneously transmitted, $P_{PUCCH,pSCell}(i)$ may be expressed by Equation 7. Alternatively, only in the dual connectivity mode UE, $P_{PUCCH,pSCell}(i)$ may be set by Equation 6.

In Equation 9, when the priority for the MCG of the PUSCH without UCI is higher than the priority for the SCG, the power may also be configured in the same manner as the CH2, CH3, CH4.

In the embodiment, it may be assumed that when some channels are not transmitted, the value for the corresponding CH is not considered in the equation. Further, according to the priority rule configuration, the channel designated by each CH may be changed and in this case, the spirit of the present invention may be extended and applied.

In the example, like the CH1 and CH2, when some power is included in the allocation of P_MeNB or P_SeNB, if the CH1 and CH2 are the PUSCH without UCI, the power scaling method may be constituted as a detailed example.

As a first example, the power scaling is performed at the time of allocating the remaining power after allocating P_MeNB or P_SeNB.

As a second example, the power scaling is performed with respect to the entire allocation power by considering the P_MeNB or P_SeNB allocated part.

Herein, the sum of the P_MeNB and the P_SeNB may be configured to be larger than P_CMAX, and in this case, at the time of applying the actual power allocation, the minimum guaranteed power needs to be recontrolled. Next, when the sum of the P_MeNB and the P_SeNB is larger than P_CMAX, a detailed example of the power allocation method is as follows.

As a first example, the sum is set to P_CMAX or less through unequal or equal scaling. Thereafter, the UE may perform the corresponding power allocation procedure.

As a second example, the value of the P_MeNB is maintained as it is and the value of the P_SeNB is recontrolled to P_CMAX-P_MeNB or less. Thereafter, the UE may perform the corresponding power allocation procedure.

As a third example, the value of the P_SeNB is maintained as it is and the value of the P_MeNB is recontrolled to P_CMAX-P_SeNB or less. Thereafter, the UE may perform the corresponding power allocation procedure.

As a fourth example, a maintained value of the P_MeNB and the P_SeNB is set through the higher layer for the UE.

The P_MeNB and the P_SeNB may be referred to as a value set in the MeNB in the early stages, and in the power allocation process, may be referred to as a value after calculating $\hat{P}_{xeNB}(i) = \min\{\hat{P}_{xeNB}, \hat{P}_{alloc\_by\_TPC}\}$.

Generally, the equations may be deployed as follows.

$$\hat{P}_{Reserved\_SeNB(MeNB)}(i) = \min\{\hat{P}_{SeNB}(i), \sum \hat{P}_{alloc\_by\_TPC\ on\ non-SRS/non-PRACH\ UL\ Tx\ to\ SeNB}(i)\}$$ [Equation 10]

$$\hat{P}_{Reserved\_SeNB(SeNB)}(i) = 0$$ [Equation 11]

$$\hat{P}_{Reserved\_MeNB(SeNB)}(i) = \min\{\hat{P}_{MeNB}(i), \sum \hat{P}_{alloc\_by\_TPC\ on\ non-SRS/non-PRACH\ UL\ Tx\ to\ MeNB}(i)\}$$ [Equation 12]

(1) $\hat{P}_{Reserved\_MeNB(MeNB)}(i) = 0$ [Equation 13]

In the following embodiment, the power allocation to the PUCCH/PUSCH will be described.

First, the CH1 having the first priority will be described. $\hat{P}_{CH1}^{r}(i)$ means the requested power by TPC and upper bounded by P_CMAX,c for first priority channel CH1.

First, if it is to MeNB, $\hat{P}_{reserved}(i) = \hat{P}_{Reserved\_S\ eNB(MeNB)}(i)$
If it is to SeNB, $\hat{P}_{reserved}(i) = \hat{P}_{Reserved\_M\ eNB(SeNB)}(i)$ $$\hat{P}_{CH1}(i) = \min\left\{\begin{array}{l}\hat{P}_{CMAX}(i) - \hat{P}_{reserved}(i) \\ \hat{P}_{CH1}^{r}(i)\end{array}\right\}$$

If the transmission is to MeNB,
$\hat{P}_{Reserved\_S\ eNB(MeNB)}(i) = \max\{\hat{P}_{Reserved\_S\ eNB(MeNB)}(i) - \hat{P}_{CH\ 1}(i), 0\}$
If the transmission is to SeNB,
$\hat{P}_{Reserved\_M\ eNB(SeNB)}(i) = \max\{\hat{P}_{Reserved\_M\ eNB(SeNB)}(i) - \hat{P}_{CH\ 1}(i), 0\}$ For the second priority UL transmission CH2
If it is to MeNB, $\hat{P}_{reserved}(i) = \hat{P}_{Reserved\_S\ eNB(MeNB)}(i)$
If it is to SeNB, $\hat{P}_{reserved}(i) = \hat{P}_{Reserved\_M\ eNB(SeNB)}(i)$ $$\hat{P}_{CH2}(i) = \min\left\{\begin{array}{l}\hat{P}_{CMAX}(i) - \hat{P}_{reserved}(i) - \hat{P}_{CH1}(i) \\ \hat{P}_{CH2}^{r}(i)\end{array}\right\}$$

If the transmission is to MeNB,
$\hat{P}_{Reserved\_S\ eNB(MeNB)}(i) = \max\{\hat{P}_{Reserved\_S\ eNB(MeNB)}(i) - \hat{P}_{CH2}(i), 0\}$
If the transmission is to SeNB,
$\hat{P}_{Reserved\_M\ eNB(SeNB)}(i) = \max\{\hat{P}_{Reserved\_M\ eNB(SeNB)}(i) - \hat{P}_{CH2}(i), 0\}$ For m-th priority UL transmission CHm
If it is to MeNB, $\hat{P}_{reserved}(i) = \hat{P}_{Reserved\_S\ eNB(MeNB)}(i)$
If it is to SeNB, $\hat{P}_{reserved}(i) = \hat{P}_{Reserved\_M\ eNB(SeNB)}(i)$ $$\hat{P}_{CHm}(i) = \min\left\{\begin{array}{l}\hat{P}_{CMAX}(i) - \hat{P}_{reserved}(i) - \sum_{k=1}^{m-1}\hat{P}_{CHk}(i) \\ \hat{P}_{CHm}^{r}(i)\end{array}\right\}$$

If the transmission is to MeNB,
$\hat{P}_{Reserved\_S\ eNB(MeNB)}(i) = \max\{\hat{P}_{Reserved\_S\ eNB(MeNB)}(i) - \hat{P}_{CHm}(i), 0\}$
If the transmission is to SeNB,
$\hat{P}_{Reserved\_M\ eNB(SeNB)}(i) = \max\{\hat{P}_{Reserved\_M\ eNB(SeNB)}(i) - \hat{P}_{CHm}(i), 0\}$ Once all power is allocated among channels, the total power for each CG is computed by summation of all power of channels transmitted to each CG. For example, if MCG has CH1, CH3, CH5 then, the summation of $\hat{P}_{CH1}(i)$, $\hat{P}_{CH3}(i)$, $\hat{P}_{CH5}(i)$ will be used for the allocated power to MCG.

In terms of handling priority, if there is more than one PUSCH in each CG, it will be treated as if one PUSCH with power is setting as the sum of all PUSCH transmissions within each CG. Herein, the PUSCH may not include the UCI. Alternatively, if there are one or more PUSCHs in each CG, it can be treated separated for each PUSCH with its own configured power. In this case, power for some PUSCH with high priority would not be scaled while some PUSCH with low priority may be dropped or power scaled. It can be considered that PUSCH in MCG has higher priority compared to PUSCH in SCG. Another method is that priority for power setting on PUSCH (without UCI) is based on (1) cell index, (2) the number of PUSCH in each CG, or (3) total payload size. It can be considered that PUSCH 1 on MCG>PUSCH 1 on SCG>PUSCH 2 on MCG>PUSCH 2 on SCG>, . . . . Once the power is allocated, Rel-11 power scaling can be applied within a CG. Thus, power scaling can be occurred within a CG once the power allocation is completed.

As another example, it may be considered that when the power of the PUCCH and the PUSCH with HARQ-ACK is determined, the remaining power is evenly scaled to all of the PUSCHs according to a weight. However, when the minimum power per CG is configured, in order to guarantee the power, the minimum power per CG may be applied only to the remaining power.

Meanwhile, for example, assuming the priority is PUCCH=PUSCH-HARQ-ACK on MCG>PUCCH=PUSCH-HARQ-ACK on SCG>PUSCH on MCG>PUSCH on SCG, the power is determined as follows.

The power for the PUCCH including the HARQ-ACK or the PUSCH including the HARQ-ACK for the MCG may be determined as follows.

$$\hat{P}_{PUCCH,MeNB}(i) = \min \left\{ \begin{array}{l} \hat{P}_{CMAX}(i) - \hat{P}_{reserved} \\ \hat{P}^r_{PUCCH,MeNB}(i) \end{array} \right\}$$ [Equation 14]

Where Preserved is calculated for the CH1 and $\hat{P}^r_{PUCCH, MeNB}(i)$ is calculated as described above.

For PUCCH-HARQ-ACK or PUSCH-HARQ-ACK on SCG, the power may be same to CH2 if PUCCH-HARQ-ACK or PUSCH-HARQ-ACK on MCG is transmitted. Otherwise, PUCCH-HARQ-ACK (or PUSCH-HARQ-ACK) on MCG power may be zero.

$$\hat{P}_{PUCCH,SeNB}(i) =$$ [Equation 15]
$$\min \left\{ \begin{array}{l} \hat{P}_{CMAX}(i) - P_{reserved} - \hat{P}_{PUCCH,MeNB}(i) \\ \hat{P}^r_{PUCCH,SeNB}(i) \end{array} \right\}$$

The PUSCH for the MCG is as follows.

$$\hat{P}_{PUSCH,MeNB}(i) = \min$$ [Equation 16]
$$\left\{ \begin{array}{l} \hat{P}_{CMAX}(i) - P_{reserved} - \hat{P}_{PUCCH,MeNB}(i) - \hat{P}_{PUCCH,SeNB}(i) \\ \hat{P}^r_{PUSCH,MeNB}(i) \end{array} \right\}$$

The PUSCH for the SCG is as follows.

$$\hat{P}_{PUSCH,SeNB}(i) =$$ [Equation 17]
$$\min \left\{ \begin{array}{l} \hat{P}_{CMAX}(i) - P_{reserved} - \hat{P}_{PUCCH,MeNB}(i) - \hat{P}_{PUCCH,SeNB}(i) - \hat{P}_{PUSCH,MeNB}(i) \\ \hat{P}^r_{PUSCH,SeNB}(i) \end{array} \right\}$$

Preserved is updated when the power is allocated for each channelRemoving the allocated power from the allocated power is a basic operation. Accordingly, it may be meant how much the power is allocated.

In summary, the above options may be summarized in the following two cases.

Case 1:

If the total requested power per CG does not exceed P_xeNB, then allocate the power.

If the total requested power per CG exceeds P_xeNB, then, for the remaining power P_CMAX−P_SeNB−P_MeNB, follow priority rule based on UCI type across CGs and allocate the remaining power in order.

For each CG, apply Rel-11 priority rule with UE total power per CG is bounded by the sum of total allocated power with P_xeNB.

Case 2:

PRACH to PCell is transmitted with the requested power.

PRACH to SCell is dropped if it collides with PRACH to PCell in a power limited case.

If not, PRACH to SCell is transmitted with the requested power otherwise.

PUCCH on cell group x is transmitted with the power=min{PPUCCH, P_CMAX−P_alloc_xeNB}

Where, P_alloc_xeNB is the summation of the allocated power to xeNB according to priority rule and min {P_xeNB, total requested power on xCG by TPC}

PUSCH with UCI on cell group x is transmitted with power=min {PPUSCH, P_CMAX−P_alloc_xeNB−PPUCCH}

PUSCH without UCI on cell group x is transmitted with power=P_CMAX−P_alloc_xeNB−PPUCCH−PPUSCH w/UCI}=sum {w(i)*PPUSCH}

The above parameters relevant to UE Tx power are in linear scale.

Meanwhile, in the case of the SRS, when there is power allocated to the cell group to which the SRS is to be transmitted or reserved power, the Rel-11 rule may be applied by using the corresponding allocated or reserved power instead of P_CMAX. Herein, the allocated power or the reserved power may be configured as (i) the minimum power (e.g., P_MeNB or P_SeNB) configured for the corresponding cell group, (ii) the sum of the minimum power configured for the corresponding cell group and the remaining power (the total sum of power used by other channels having the higher priority than the corresponding SRS except for P_MeNB and P_SeNB), or (iii) a difference of the total sum of power used by other channels having the higher priority than the corresponding SRS in P_CMAX. In more detail, it may be considered that the SRS is transmitted only in a specific situation such as (i) a case in which only the SRS is present in the cell group, (ii) a case in which only one SRS is present, (iii), a case in which only the periodic SRS is present, or (iv) a case in which the aperiodic SRS is present. In this case, the SRS may be power-scaled.

<Third Disclosure of Present Specification>

The third disclosure of the present specification proposes a method for solving a power control in the time synchronization is not matched between the MCG and the SCG.

In the dual connectivity situation, it may be assumed that an interface of the subframe between two eNodeBs is not matched in timing.

FIGS. 11a to 11e illustrate one example for power control in a situation in which subframes are asynchronous among eNodeBs.

Referring to the illustrated examples, it may be considered that a subframe I of the first eNodeB overlaps with a subframe k and a subframe k+1 of the second eNodeB. In this case, it may be considered that an overlapping area is divided into many parts to perform power control and power scaling. For example, Pcmax and Pcmax,c may be set for each overlapping part (hereinafter, setting for subframe (i, k) and subframe (i, k+1)) and even during power scaling, the Pcmax and Pcmax,c are calculated according to the above method for each overlapping part and then the final power for each subframe may be set to the minimum value of the power for the overlapping part corresponding to the subframe. As an example, when the power for the subframe i of the first eNodeB is calculated, a subframe k of the second eNodeB overlapping with the eNodeB subframe i sets the power(i, k) according to the power scaling and the subframe k+1 of the second eNodeB calculates power(i, k+1) according to the power scaling, and then the power for the subframe i of the first eNodeB may be set to the minimum value of power(i, k) and power(i, k+1). In the second disclosure of the present specification, as an example, when CH1 corresponds to the MCG and CH2 corresponds to the SCG, it may be considered that the power of the CH2 is set by the following Equation.

$$\hat{P}_{CH2}(i; k) = \min\left\{ \begin{array}{l} \hat{P}_{CMAX}(i) - \hat{P}_{reserved}(k) - \hat{P}_{CH1}(k) \\ \hat{P}^r_{CH2}(i) \end{array} \right\}$$ [Equation 18]

$$\hat{P}_{CH2}(i; k+1) = \min\left\{ \begin{array}{l} \hat{P}_{CMAX}(i) - \hat{P}_{reserved}(k+1) - \hat{P}_{CH1}(k+1) \\ \hat{P}^r_{CH2}(i) \end{array} \right\}$$

$$\hat{P}_{CH2}(i) = \min\{\hat{P}_{CH2}(i; k) - \hat{P}_{CH2}(i; k+1)\}$$

In the above description, when each eNodeB sets the power for the corresponding uplink channel, in order to obtain a TPC command for another eNodeB, it is required to detect (E)PDCCH and the like. In some cases, power information for another eNodeB may not be perfect due to the processing time shortage, and in this case, like the aforementioned method, it is not efficient to apply the priority rule considering all of the overlapped parts described above. In order to solve the problem, the network determines whether look-ahead is enabled or disabled through the higher layer.

Due to the processing time shortage, even though the PUCCH/PUSCH do not use the power setting information of another eNodeB (the look-ahead is disabled), exceptionally, the PRACH and/or SRS may be configured to use the power setting information for another eNodeB. As an example, in the case of the PRACH, an environment of configuring whether the PRACH is transmitted to the UE terminal may be considered, and in the case of the PRACH transmission by the PDCCH order, the PDCCH order includes 6 subframes from the received time to be transmitted hereinafter, and thus the processing time may be sufficient. Further, even when the SRS is first transmitted and the channel having higher priority is transmitted to another eNodeB, the SRS is transmitted only to the final OFDM symbol in the subframe and thus the processing time is sufficient.

Further, when a high priority is given in a cell group corresponding to earlier transmission when performing power control between different cell groups in the SRS transmission, the SRS is transmitted only in the final OFDM symbol and thus, it may be considered that the power is set unlike the PUCCH/PUSCH. More particular examples are as follows.

As a first example, the SRS configures a high priority to the earlier transmitted channel based on the transmitted subframe. For example, when the subframe including the SRS is earlier than the subframe including the channel transmitted from another cell group, the priority for the SRS is configured to be high and the power may be first allocated. The channel may exclude the SRS and in this case, it may be assumed that the priority is the same between the SRSs even though the cell groups are different. Further, even in the PRACH, exceptionally, it may be considered that the higher priority is continuously given to the PRACH than the SRS. It may be limited that the PRACH is transmitted by the PDCCH order. For this reason, it may be efficient when the power control is performed and the SRS power setting is performed at the same time as another channel such as PUCCH/PUSCH.

As a second example, based on the time (OFDM symbol unit and the like) when the SRS is actually transmitted, a high priority is set to the first transmitted channel. For example, even though the subframe including the SRS is earlier than the subframe including the channel transmitted from another cell group such as PUCCH/PUSCH/PRACH, when a location where the final OFDM symbol to which the SRS is actually transmitted starts is latter than the transmission time of the PUCCH/PUSCH/PRACH in another cell group, the PUCCH/PUSCH/PRACH and the like transmitted from another cell is recognized as the earlier transmitted channel and configures a high priority. Similarly, at the actual transmission time, when the SRS is first transmitted, it may be considered that the SRS is configured to the higher priority than the channels in another group. The channel may exclude the SRS and in this case, it may be assumed that the priority is the same between the SRSs even though the cell groups are different. Further, even in the PRACH, exceptionally, it may be considered that the higher priority is continuously given to the PRACH than the SRS. It may be limited that the PRACH is transmitted by the PDCCH order. The method may be efficient when the power setting for the SRS is performed at an independent time from the PUCCH/PUSCH.

On the other hand, when the PRACHs transmitted from the MCG and the SCG are partially overlapped, for example, a case where the PRACH transmitted to the MCG collides at the later location of the PRACH having a 3-subframe length or a case where the processing time is insufficient according to implementation during SRS transmission may occur. Even in this case, the power may be first allocated to the PRACH transmitted to the MCG or the PCell, and the SRS needs to be configured to ensure the power of the channel of another cell group having high priority overlapping at the later time.

For example, the PRACH limits the UL transmit power of another eNodeB with respect to all or some PRACH resources (the subframe which may be transmitted by the PRACH). The corresponding power may be set to the minimum UE transmit power of the corresponding cell group and set to P_CMAX—minimum UE transmit power. As an example, it may be considered that the SRS configures the power of the SRS to the minimum UE transmit power of the corresponding cell group with respect to all or some SRS resources (the SF which may be transmitted by the SRS). In the case of using some subframe resources, the corresponding information may be a predetermined value and may be a value configured by the network through the higher layer.

<Fourth Disclosure of Present Specification>

In the fourth disclosure of the present specification, in a dual connectivity situation, a method of piggybacking the UCI by the UE on the PUSCH will be described.

In the dual connectivity situation, collision between the PUCCH and the PUSCH with UCI included in the different cell groups may occur and according to the situation, the power scaling may be required. For example, when it is considered that the power scaling occurs in the PUSCH, the transmission reliability for the UCI included in the PUSCH may be decreased. As a result, the suitable scheduling in the eNodeB receiving the corresponding UCI is not performed and thus packet throughput performance experienced by the user may be deteriorated. Based on the existing 3GPP LTE Rel-12, when the PUSCH is transmitted to the PCell, the UCI is piggybacked on the PUSCH to the PCell, and when the PUSCH is not transmitted to the PCell, the UCI is piggybacked on the PUSCH having the smallest cell index among the SCells transmitting the PUSCH. Next, in the case of the power-limited UE or only when an UCI piggyback operation is configured through the high layer signal, this is a detailed example for a method of selecting the PUSCH to piggyback the UCI and may be differently configured for each UCI type.

As an example, based on a cell index, the UE selects the PUSCH of the cell having the smallest cell index. Even in this case, when the PUSCH of the PCell (alternatively, PSCell) is present, the UE selects the PUSCH of the PCell (alternatively, PSCell).

As a second example, the UE selects the PUSCH corresponding to the cell having the largest number of coded bits for the corresponding UCI. Alternatively, based on the subcarrier number allocated during the initial transmission of the corresponding PUSCH, the OFDM symbol number, the transport block size for the UL-SCH, a modulation order used in the PUSCH, and the like, a PUSCH to piggyback the UCI may be selected.

As a third example, the UE selects a PUSCH having the most power for the PUSCH.

As a fourth example, the UE selects a PUSCH having the most power per unit bit for the UCI. In this case, based on the power for the PUSCH, the number of coded modulation symbols for the corresponding UCI, a modulation order, and the like, the PUSCH may be selected.

Figure 12:
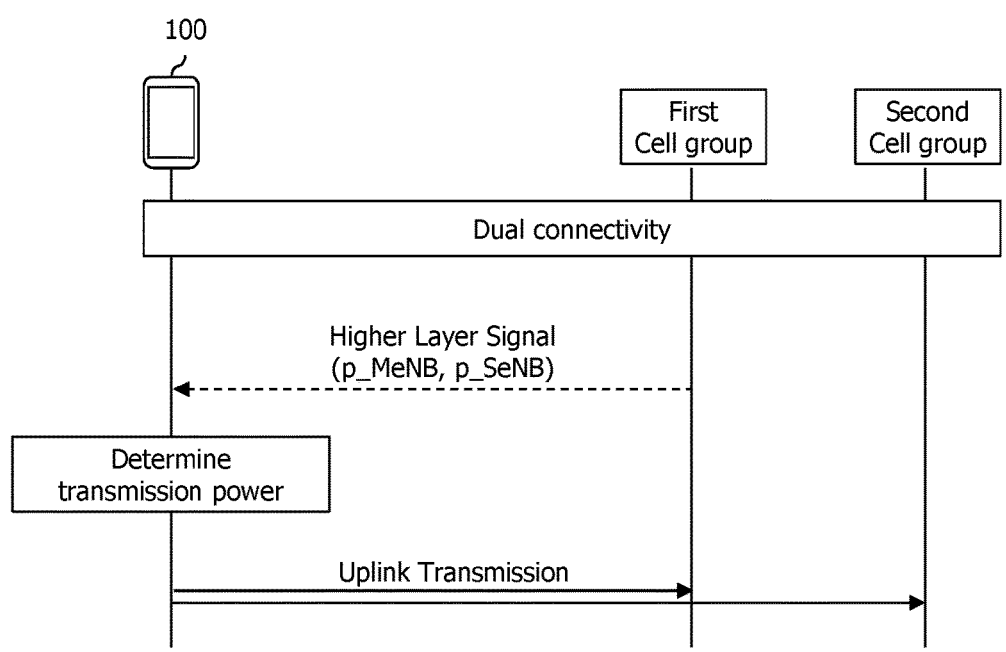
FIG. 12 is a flowchart of a summarized disclosures of the present specification.

FIG. 12 is a flowchart illustrating a summarized disclosure of the present specification.

Referring to FIG. 12, a UE 100 determines an amount of power in a state in which a dual connectivity to a first cell group and a second cell group is set. Specifically, the UE determines first amount of power for a transmission of a first UCI, and determines second amount of power for a transmission of a second UCI. If the first UCI includes HARQ-ACK but the second UCI does not include HARQ-ACK, the determination of the first amount of the power is prioritized over the determination of the second amount of the power.

If the first UCI includes HARQ-ACK to the first cell group and the second UCI include HARQ-ACK to the second cell group, the determination of the first amount of the power may be prioritized over the determination of the second amount of the power.

If the first amount of the power exceeds a specific value, the first amount of the power may be scaled down.

Meanwhile, if p_MeNB, which indicates power guaranteed for the first eNodeB, and p_SeNB, which indicates power guaranteed for the second eNodeB, are received using a high layer signal, p_MeNB and p_SeNB may be considered in the above determination.

The above determination may be performed when a first subframe on which the first UCI is transmitted is overlapped with a second subframe on which the second UCI is transmitted.

The embodiments of the present invention which has been described up to now may be implemented through various means. For example, the embodiments of the present invention may be implemented by hardware, firmware, software, or combinations thereof. In detail, the embodiments will be descried with reference to the drawings.

Figure 13:
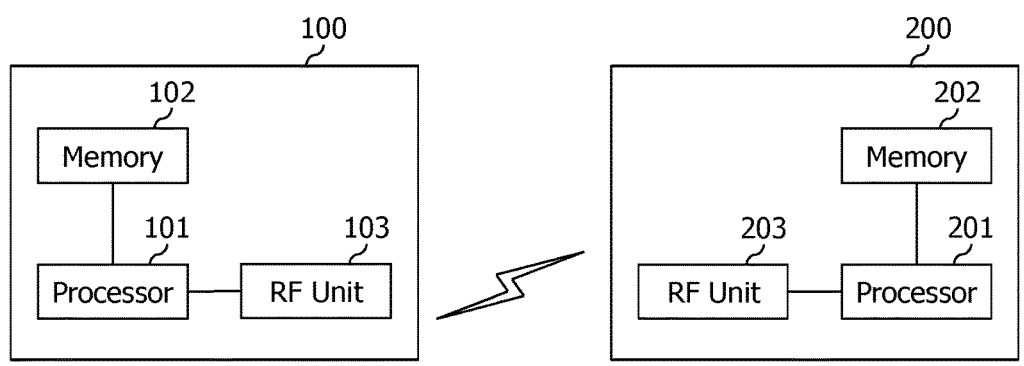
FIG. 13 is a block diagram illustrating a wireless communication system in which the disclosures of the present specification is implemented.

FIG. 13 is a block diagram illustrating a wireless communication system in which a disclosure of the present specification is implemented.

The base station 200 includes a processor 201, a memory 202, and a radio frequency (RF) unit 203. The memory 202 is connected with the processor 201 to store various pieces of information for driving the processor 201. The RF unit 203 is connected with the processor 201 to transmit and/or receive a radio signal. The processor 201 implements a function, a process, and/or a method which are proposed. In the aforementioned embodiment, the operation of the base station may be implemented by the processor 201.

UE 100 includes a processor 101, a memory 102, and an RF unit 103. The memory 102 is connected with the processor 101 to store various pieces of information for driving the processor 101. The RF unit 103 is connected with the processor 101 to transmit and/or receive a radio signal. The processor 101 implements a function, a process, and/or a method which are proposed.

The processor may include an application-specific integrated circuit (ASIC), another chip set, a logic circuit and/or a data processing apparatus. The memory may include a read-only memory (ROM), a random access memory (RAM0, a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for performing a power scaling, the method performed by a user equipment (UE) and comprising:

determining, by the UE configured with dual connectivity to a master cell group (MCG) and a secondary cell group (SCG), a first power for a first transmission in a first subframe toward the MCG;

wherein the first power for the first transmission toward the MCG is determined to be less than or equal to a first threshold configured for the MCG, determining a second power for a second transmission toward the SCG;

determining that a total power related to the MCG and the SCG exceeds a maximum total power, based on the determining that the total power related to the MCG and the SCG exceeds the maximum total power, scaling down the second power for the second transmission toward the SCG if the first transmission toward the MCG in the first subframe is overlapped with the second transmission toward the SCG.

2. The method of claim 1, wherein the second power for the second transmission toward the SCG is determined to be less than or equal to a second threshold configured for the SCG.

3. The method of claim 1, wherein the first power for the first transmission toward the MCG is not scaled down if the maximum total power is exceeded.

4. The method of claim 1, wherein the first transmission includes transmitting at least one of a first physical uplink control channel (PUCCH) and a first physical uplink shared channel (PUSCH).

5. The method of claim 4, wherein at least one of the first PUCCH and the first PUSCH includes at least one of a hybrid automatic repeat request (HARQ) acknowledgement (ACK)/negative-acknowledgement (NACK) signal and a scheduling request (SR).

6. The method of claim 1, wherein the second transmission includes transmitting at least one of a second PUCCH and a second PUSCH.

7. The method of claim 6, wherein at least one of the second PUCCH and the second PUSCH includes a HARQ ACK/NACK signal and a SR.

8. The method of claim 1, wherein at least one of the first power and the second power is shared across the MCG and the SCG.

9. A user equipment (UE) for performing a power scaling, the UE comprising:
a reception unit configured with a dual connectivity to a master cell group (MCG) and a secondary cell group (SCG); and
a processor configured to:
determine a first power for a first transmission in a first subframe toward the MCG;
wherein the first power for the first transmission toward the MCG is determined to be less than or equal to a first threshold configured for the MCG,
determine a second power for a second transmission toward the SCG;
determine that a total power related to the MCG and the SCG exceeds a maximum total power,
based on the determination that the total power related to the MCG and the SCG exceeds the maximum total power, scale down the second power for the second transmission toward the SCG if the first transmission toward the MCG in the first subframe is overlapped with the second transmission toward the SCG.

10. The UE of claim 9, wherein the second power for the second transmission toward the SCG is determined to be less than or equal to a second threshold configured for the SCG.

11. The UE of claim 9, wherein the first power for the first transmission toward the MCG is not scaled down if the maximum total power is exceeded.

12. The UE of claim 9, wherein the first transmission includes transmitting at least one of a first physical uplink control channel (PUCCH) and a first physical uplink shared channel (PUSCH).

13. The UE of claim 12, wherein at least one of the first PUCCH and the first PUSCH includes at least one of a hybrid automatic repeat request (HARQ) acknowledgement (ACK)/negative-acknowledgement (NACK) signal and a scheduling request (SR).

14. The UE of claim 9, wherein the second transmission transmitting includes at least one of a second PUCCH and a second PUSCH.

15. The UE of claim 14, wherein at least one of the second PUCCH and the second PUSCH includes a HARQ ACK/NACK signal and a SR.

16. The UE of claim 9, wherein at least one of the first power and the second power is shared across the MCG and the SCG.

* * * * *